United States Patent
Cho et al.

(10) Patent No.: US 9,560,594 B2
(45) Date of Patent: Jan. 31, 2017

(54) ACCESS POINT RESPONSE TO PS-POLL

(71) Applicant: QUALCOMM Incorporated, San Diego, CA (US)

(72) Inventors: James Simon Cho, Mountain View, CA (US); Arunkumar Jayaraman, San Jose, CA (US); Guido Robert Frederiks, Aptos, CA (US); Zhanfeng Jia, Belmont, CA (US); Shu Du, Milpitas, CA (US); Alireza Raissinia, Monte Sereno, CA (US); Jibing Wang, San Diego, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 14/277,623

(22) Filed: May 14, 2014

(65) Prior Publication Data

US 2014/0341099 A1    Nov. 20, 2014

Related U.S. Application Data

(60) Provisional application No. 61/823,863, filed on May 15, 2013.

(51) Int. Cl.
*H04W 52/02* (2009.01)
*H04W 72/02* (2009.01)
(Continued)

(52) U.S. Cl.
CPC ............ *H04W 52/0238* (2013.01); *H04L 1/08* (2013.01); *H04W 52/0206* (2013.01);
(Continued)

(58) Field of Classification Search
CPC . H04L 1/08; H04W 52/0206; H04W 52/0216; H04W 52/0235; H04W 52/0238; H04W 72/02; H04W 84/12; Y02B 60/50
(Continued)

(56) References Cited

U.S. PATENT DOCUMENTS

| 4,939,731 A | * | 7/1990 | Reed | ...................... H04L 1/0003 |
| | | | | 714/708 |
| 7,058,071 B1 | | 6/2006 | Myles et al. | |

(Continued)

FOREIGN PATENT DOCUMENTS

| EP | 2530969 A1 | 12/2012 |
| WO | WO-2005112355 A1 | 11/2005 |

(Continued)

OTHER PUBLICATIONS

Hunter et al., "IEEE P1901 Draft Standard for Broadband Over Power Line Networks: Medium Access Control and Physical Layer Specifications Proposal for the IEEE 1901 In-Home Power Line Networks Communications Standard," P1901 0387 r0 Merged HomePlug Panasonic HiSilicon IH, Apr. 14, 2008, IEEE Proposed Standard, Piscataway, NJ, 1552 pgs.

(Continued)

*Primary Examiner* — Stephen J Clawson
(74) *Attorney, Agent, or Firm* — Holland & Hart LLP

(57) ABSTRACT

Methods, systems, and devices are described for power conservation in a wireless communications system through efficient transmissions and acknowledgements of information between an AP and a station. The time between a determination by a station to enter a power saving mode and entering network sleep mode by the station may be reduced through a transmission, by an AP, of an MPDU to the station successive to an SIFS after transmission of an acknowledgement to the station of a PS-Poll frame from the station. The (Continued)

time to enter a power saving mode by a station may also be reduced through transmission of A-MPDUs in which a last MPDU of the A-MPDU has an indicator bit cleared to indicate no additional data is to be transmitted. An AP may prevent a retransmission of an MPDU to the station in the absence of an acknowledgement from the station, to further enhance efficiency.

26 Claims, 30 Drawing Sheets

(51) Int. Cl.
    *H04L 1/08* (2006.01)
    *H04W 84/12* (2009.01)
(52) U.S. Cl.
    CPC ... *H04W 52/0216* (2013.01); *H04W 52/0235* (2013.01); *H04W 72/02* (2013.01); *H04W 84/12* (2013.01); *Y02B 60/50* (2013.01)
(58) Field of Classification Search
    USPC ........................................................ 370/311
    See application file for complete search history.

(56) References Cited

U.S. PATENT DOCUMENTS

| | | | |
|---|---|---|---|
| 7,583,625 B2 | 9/2009 | Bennett | |
| 7,656,831 B2 | 2/2010 | Gao et al. | |
| 8,098,577 B2 | 1/2012 | De Vos et al. | |
| 8,374,192 B2 | 2/2013 | Surineni et al. | |
| 8,442,016 B1 | 5/2013 | Lee et al. | |
| 8,675,568 B2* | 3/2014 | Pelletier | H04W 52/0225 370/328 |
| 2004/0185820 A1* | 9/2004 | Ogura | H04W 52/0245 455/343.1 |
| 2004/0203474 A1 | 10/2004 | Miller et al. | |
| 2005/0013246 A1* | 1/2005 | Miyake | H04L 1/0002 370/230 |
| 2006/0150050 A1 | 7/2006 | Choi et al. | |
| 2007/0086369 A1 | 4/2007 | Tang | |
| 2007/0177534 A1 | 8/2007 | Chen | |
| 2008/0095091 A1* | 4/2008 | Surineni | H04W 52/0225 370/311 |
| 2008/0112345 A1 | 5/2008 | Sivakumar et al. | |
| 2009/0097438 A1 | 4/2009 | Kneckt et al. | |
| 2009/0137206 A1 | 5/2009 | Sherman et al. | |
| 2009/0238157 A1 | 9/2009 | Poeyhonen et al. | |
| 2009/0238158 A1 | 9/2009 | Lewis | |
| 2009/0252143 A1 | 10/2009 | Sridhara et al. | |
| 2010/0040033 A1 | 2/2010 | Xhafa et al. | |
| 2010/0130129 A1 | 5/2010 | Chang et al. | |
| 2010/0202347 A1 | 8/2010 | Sridhara et al. | |
| 2010/0315999 A1 | 12/2010 | Kakani et al. | |
| 2011/0029632 A1 | 2/2011 | Siemens | |
| 2011/0170424 A1 | 7/2011 | Safavi et al. | |
| 2011/0188424 A1* | 8/2011 | Ramamurthy | H04W 28/065 370/311 |
| 2011/0199971 A1 | 8/2011 | Kim et al. | |
| 2011/0222429 A1* | 9/2011 | Ito | H04L 27/2613 370/252 |
| 2011/0249605 A1 | 10/2011 | Kwon et al. | |
| 2012/0106418 A1 | 5/2012 | Xhafa et al. | |
| 2012/0207087 A1 | 8/2012 | Wentink et al. | |
| 2012/0213116 A1 | 8/2012 | Koo et al. | |
| 2012/0230200 A1 | 9/2012 | Wentink | |
| 2012/0257585 A1 | 10/2012 | Sydor et al. | |
| 2012/0322476 A1 | 12/2012 | Sun et al. | |
| 2013/0051293 A1 | 2/2013 | Wentink et al. | |
| 2013/0100952 A1 | 4/2013 | Hart et al. | |
| 2013/0145224 A1 | 6/2013 | Kim et al. | |
| 2013/0176939 A1 | 7/2013 | Trainin et al. | |
| 2013/0294360 A1 | 11/2013 | Yang et al. | |
| 2014/0029597 A1* | 1/2014 | Chu | H04W 52/0206 370/338 |
| 2014/0071873 A1 | 3/2014 | Wang et al. | |
| 2014/0177687 A1* | 6/2014 | Seol | H04L 1/18 375/219 |
| 2014/0211766 A1* | 7/2014 | Zhao | H04W 72/1215 370/336 |
| 2014/0321349 A1 | 10/2014 | Seok et al. | |
| 2014/0341098 A1* | 11/2014 | Cho | H04W 52/0238 370/311 |
| 2014/0341100 A1 | 11/2014 | Sun et al. | |
| 2015/0098374 A1 | 4/2015 | Homchaudhuri et al. | |
| 2015/0103767 A1 | 4/2015 | Kim et al. | |
| 2015/0146600 A1 | 5/2015 | Yang et al. | |

FOREIGN PATENT DOCUMENTS

| | | |
|---|---|---|
| WO | WO-2011097141 A2 | 8/2011 |
| WO | WO-2012021879 A2 | 2/2012 |
| WO | WO-2012134193 A2 | 10/2012 |

OTHER PUBLICATIONS

ISA/EPO, International Search Report and Written Opinion of the International Searching Authority, Int'l App. No. PCT/US2014/038095, Aug. 26, 2014, European Patent Office, Rijswijk, NL 12 pgs.

* cited by examiner

ACCESS POINT RESPONSE TO PS-POLL

CROSS REFERENCES

The present Application for Patent claims priority to U.S. Provisional Patent Application No. 61/823,863 by Cho et al., entitled "SIFS Response to PS-Poll," filed May 15, 2013, assigned to the assignee hereof, and expressly incorporated by reference herein. The present Application is related to copending application Ser. No. 14/277,613 by Cho et al., entitled "ACCESS POINT RESPONSE TO PS-POLL," filed May 14, 2014, assigned to the assignee hereof, and expressly incorporated by reference herein. The present Application is also related to copending application No. Ser. No. 14/277,624, by Sun et al., entitled "ACCESS POINT-AIDED COEXISTENCE/CONCURRENCY AT MOBILE DEVICES," filed May 14, 2014, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network devices such as access points (APs) that can support communication for a number of wireless devices. A wireless device may communicate with a network device bi-directionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In WLANs, there may be cases in which a station may desire to enter a power saving mode in which transmissions between an AP and station are reduced, allowing the station to power off a component(s), such as radio components, and thereby reduce power consumption. Existing power saving techniques may, in some cases, result in relatively long periods of time between a determination by a station to enter a power saving mode and the powering off of related components, because of related network signaling to notify and confirm power saving mode with an AP. Therefore, power conservation techniques are desirable that are simple to implement and have relatively short time periods between a determination to enter a power save mode by a station and the station entering a power conservation mode.

SUMMARY

Various methods, systems, devices, and apparatuses are described for wireless communications that may provide efficient transmissions and acknowledgements of information between an AP and a station. The time between a determination by a station to enter a power saving mode and entering network sleep mode by the station may be reduced through a transmission, by an AP, of a media access control (MAC) protocol data unit (MPDU) to the station successive to a short interframe space (SIFS) after transmission of an acknowledgement to the station of a PS-Poll frame from the station. Transmission of the MPDU after the SIFS following the acknowledgement may reduce the time associated with random backoffs following an acknowledgement of the AP, and may reduce or eliminate the time associated with queue delay, other traffic, or collisions of traffic with another station(s). The time to enter a power saving mode by a station may also be reduced through transmission of aggregated MPDUs (A-MPDUs), with initial MPDUs of an A-MPDU having an indicator bit set to indicate more data and a last MPDU of the A-MPDU having its indicator bit cleared to indicate no additional data is to be transmitted. Efficiencies may further be enhanced through an AP preventing a retransmission of an MPDU to the station in the absence of an acknowledgement from the station that the MPDU is received.

According to an aspect of the disclosure, a method for wireless communications is provided. The method generally includes receiving a power save poll (PS-Poll) frame by the access point from a station, transmitting a media access control (MAC) protocol data unit (MPDU) to the station responsive to the PS-Poll frame, determining if an acknowledgement of the MPDU is received from the station, and preventing a retransmission of the MPDU to the station in the absence of the acknowledgement from the station that the MPDU is received. In some examples, a data transmission rate for the station may remain unadjusted in the absence of the acknowledgement from the station that the MPDU is received. In other examples the data transmission rate for the station may remain unadjusted in the absence of the acknowledgement from the station that the MPDU is received for a set number of retransmissions and may be adjusted following the set number of retransmissions. Additionally or alternatively, the access point may receive an acknowledgement from the station to one of the MPDU retransmissions, and adjust the data transmission rate for the station responsive to the MPDU retransmission acknowledgement. Such an adjustment may include, for example, updating a rate adaptation table responsive to the unacknowledged MPDU transmission(s).

In some examples, the method may also include determining that the acknowledgement is not received due to a channel condition of a transmission channel, and adjusting the data transmission rate for the station responsive to the channel condition. In some examples, the access point may, additionally or alternatively, assume that the station has gone to network sleep following transmitting a limited number of retransmissions. In further examples, the access point may transmit, prior to transmitting the MPDU, an acknowledgement to the station that the PS-Poll frame is received.

In some examples, wherein the MPDU comprises an aggregated media access control protocol data unit (A-MPDU) comprising a plurality of aggregated MPDUs to the station responsive to the PS-Poll frame, the plurality of aggregated MPDUs comprising a first MPDU and a last MPDU each comprising an indicator bit to indicate whether more data is to be transmitted to the station, and wherein the indicator bit of the first MPDU is set to indicate more data and the indicator bit of the last MPDU is cleared to indicate no additional data is to be transmitted.

In some examples, the method may further include transmitting, prior to transmitting the A-MPDU, an acknowledgement to the station that the PS-Poll frame is received following a short interframe space (SIFS). The A-MPDU may be transmitted successive to an SIFS after transmission of the acknowledgement to the station. In some examples, the method may include receiving a block acknowledgement (BA) from the station that the A-MPDU is received and indicating that an MPDU of the A-MPDU was not successfully received; and assuming the station has gone to network sleep. The method may further include receiving a second PS-Poll frame from the station; and transmitting a second A-MPDU to the station comprising an MPDU including data from the MPDU(s) not successfully received. The BA may include a starting sequence number of MPDUs and a bitmap indicating successful reception of a plurality of MPDUs sequenced prior to the starting sequence number.

In some examples, the method may include determining that a block acknowledgement (BA) is not received from the station; determining that additional data is to be transmitted to the station that is included in the A-MPDU; adding an additional MPDU to the A-MPDU to generate a second A-MPDU; and transmitting the second A-MPDU to the station.

Another aspect of the disclosure provides another method for wireless communications. The method generally includes receiving a power save poll (PS-Poll) frame from a station, transmitting an acknowledgement to the station that the PS-Poll frame is received following a short interframe space (SIFS), and transmitting a media access control (MAC) protocol data unit (MPDU) to the station responsive to the PS-Poll frame successive to an SIFS after transmission of the acknowledgement to the station. In some examples, the access point may also receive an acknowledgement from the station that the MPDU is received, and assume the station has gone to network sleep. In some examples, the method may also include limiting a number of retransmissions of the MPDU to the station in the absence of the acknowledgement from the station that the MPDU is received, or assuming that the station has gone to network sleep following transmitting the limited number of retransmissions.

In some examples, the AP may determine that more data is to be transmitted to the station than is included in the MPDU, an indicator bit may be set in the MPDU to indicate that more data is to be transmitted to the station, and the AP may assume the station has gone to network sleep following transmission of the MPDU. The assuming may include, for example, receiving an acknowledgement from the station that the MPDU is received, and assuming the station has gone to network sleep. The access point may receive a second PS-Poll frame from the station, and transmit a second MPDU to the station responsive to the second PS-Poll including the more data. In some examples, transmitting the second MPDU may include determining that no additional data is to be transmitted to the station following transmission of the MPDU, setting an indicator bit in the MPDU to indicate that no more data is to be transmitted to the station, and assuming the station has gone to network sleep following transmission of the MPDU. The MPDU may include, for example, an aggregated MPDU (A-MPDU) comprising a number of aggregated MPDUs, each of the aggregated MPDUs having an indicator bit to indicate whether more data is to be transmitted to the station. The method may further include, receiving a block acknowledgement (BA) from the station that each MPDU of the A-MPDU is successfully received, assuming the station has gone to network sleep, receiving a second PS-Poll frame from the station, and transmitting a second MPDU to the station with the indicator bit cleared to indicate no additional data is to be transmitted.

In some examples, the MPDU includes an aggregated media access control protocol data unit (A-MPDU) comprising a plurality of aggregated MPDUs to the station responsive to the PS-Poll frame, the plurality of aggregated MPDUs comprising a first MPDU and a last MPDU each comprising an indicator bit to indicate whether more data is to be transmitted to the station, and wherein the indicator bit of the first MPDU is set to indicate more data and the indicator bit of the last MPDU is cleared to indicate no additional data is to be transmitted. The acknowledgement to the station may be transmitted prior to transmitting the A-MPDU. The A-MPDU may be transmitted successive to an SIFS after transmission of the acknowledgement to the station.

In some examples, a block acknowledgement (BA) may be received from the station, the BA indicating that the A-MPDU is received and that an MPDU of the A-MPDU was not successfully received. It may then be assumed that the station has gone to network sleep. In additional or alternative examples, a second PS-Poll frame may be received from the station; and a second A-MPDU may be transmitted to the station comprising an MPDU including data from the MPDU(s) not successfully received. The BA may include a starting sequence number of MPDUs and a bitmap indicating successful reception of a plurality of MPDUs sequenced prior to the starting sequence number.

In some examples, the method may further include determining that a block acknowledgement (BA) is not received from the station; determining that more data is to be transmitted to the station that is included in the A-MPDU; adding an additional MPDU to the A-MPDU to generate a second A-MPDU; and transmitting the second A-MPDU to the station.

A further aspect of the disclosure provides another method for wireless communications. The method generally includes receiving a power save poll (PS-Poll) frame from a station, and transmitting an aggregated media access control protocol data unit (A-MPDU) that includes a number of aggregated MPDUs to the station responsive to the PS-Poll frame. The number of aggregated MPDUs may include a first MPDU and a last MPDU each comprising an indicator bit to indicate whether more data is to be transmitted to the station, and the indicator bit of the first MPDU is set to indicate more data and the indicator bit of the last MPDU is cleared to indicate no additional data is to be transmitted. The method may also include, in some examples, transmitting, prior to transmitting the A-MPDU, an acknowledgement to the station that the PS-Poll frame is received following a short interframe space (SIFS). The A-MPDU may be transmitted, for example, following an SIFS after transmission of the acknowledgement to the station.

In some examples, the method may also include receiving a block acknowledgement (BA) from the station that the A-MPDU is received and indicating that an MPDU of the A-MPDU was not successfully received, and assuming the station has gone to network sleep. Following receipt of the BA, the method may also include receiving a second PS-Poll frame from the station, and transmitting a second A-MPDU to the station comprising an MPDU including data from the MPDU(s) not successfully received. The BA may include, for example, a starting sequence number of MPDUs and a bitmap indicating successful reception of a plurality of MPDUs sequenced prior to the starting sequence number. In some examples, the method may also include determining that a BA is not received from the station, determining that more data is to be transmitted to the station that is included in the A-MPDU, adding an additional MPDU to the A-MPDU to generate a second A-MPDU, and transmitting the second A-MPDU to the station.

Another aspect of the disclosure provides an apparatus for wireless communications. The apparatus generally includes means for receiving a power save poll (PS-Poll) frame from a station, means for transmitting a media access control (MAC) protocol data unit (MPDU) to the station responsive to the PS-Poll frame; means for determining if an acknowledgement of the MPDU is received from the station, and means for preventing a retransmission of the MPDU to the station in the absence of the acknowledgement from the station that the MPDU is received.

Another aspect of the disclosure provides an apparatus for wireless communications. The apparatus generally includes means for receiving a power save poll (PS-Poll) frame from a station, means for transmitting an acknowledgement to the station that the PS-Poll frame is received following a short interframe space (SIFS), and means for transmitting a media access control (MAC) protocol data unit (MPDU) to the station responsive to the PS-Poll frame successive to an SIFS after transmission of the acknowledgement to the station.

Another aspect of the disclosure provides another apparatus for wireless communications. The apparatus generally includes means for receiving a power save poll (PS-Poll) frame from a station, and means for transmitting an aggregated media access control protocol data unit (A-MPDU) including a number of aggregated MPDUs to the station responsive to the PS-Poll frame, the aggregated MPDUs including a first MPDU and a last MPDU each having an indicator bit to indicate whether more data is to be transmitted to the station, and the indicator bit of the first MPDU set to indicate more data and the indicator bit of the last MPDU cleared to indicate no additional data is to be transmitted.

In a further aspect, the disclosure provides another apparatus for wireless communications. The apparatus generally includes a receiver module configured to receive a PS-Poll frame from a station, a transmitter module configured to transmit a media access control (MAC) protocol data unit (MPDU) to the station responsive to the PS-Poll frame, and a power save communications module configured to determine if an acknowledgement of the MPDU is received from the station and prevent a retransmission of the MPDU to the station in the absence of the acknowledgement from the station that the MPDU is received.

In yet a further aspect, the disclosure provides another apparatus for wireless communications. The apparatus generally includes a receiver configured to receive a power save poll (PS-Poll) frame from a station, and a transmitter configured to transmit an acknowledgement to the station that the PS-Poll frame is received following a short interframe space (SIFS), and to transmit a media access control (MAC) protocol data unit (MPDU) to the station responsive to the PS-Poll frame successive to an SIFS after transmission of the acknowledgement to the station.

In still a further aspect, the disclosure provides another apparatus for wireless communications. The apparatus generally includes a receiver configured to receive a power save poll (PS-Poll) frame from a station, and a transmitter configured to transmit an aggregated media access control protocol data unit (A-MPDU) including a number of aggregated MPDUs to the station responsive to the PS-Poll frame, the number of aggregated MPDUs including a first MPDU and a last MPDU each having an indicator bit to indicate whether more data is to be transmitted to the station, and wherein the indicator bit of the first MPDU is set to indicate more data and the indicator bit of the last MPDU is cleared to indicate no additional data is to be transmitted.

In another aspect, the disclosure provides a device for wireless communications. The device generally includes a processor and a memory in electronic communication with the processor. The memory embodying instructions executable by the processor to receive a power save poll (PS-Poll) frame from a station, transmit a media access control (MAC) protocol data unit (MPDU) to the station responsive to the PS-Poll frame, determine if an acknowledgement of the MPDU is received from the station, and prevent a retransmission of the MPDU to the station in the absence of the acknowledgement from the station that the MPDU is received.

Another aspect of the disclosure provides another device for wireless communications. The device generally includes a processor and a memory in electronic communication with the processor. The memory embodying instructions executable by the processor to receive a power save poll (PS-Poll) frame from a station, transmit an acknowledgement to the station that the PS-Poll frame is received following a short interframe space (SIFS), and transmit a media access control (MAC) protocol data unit (MPDU) to the station responsive to the PS-Poll frame successive to a SIFS after transmission of the acknowledgement to the station.

Still a further aspect of the disclosure provides a device for wireless communications. The device generally includes a processor and a memory in electronic communication with the processor. The memory embodying instructions executable by the processor to receive a power save poll (PS-Poll) frame from a station, and transmit an aggregated media access control protocol data unit (A-MPDU) including a number of aggregated MPDUs to the station responsive to the PS-Poll frame, the number of aggregated MPDUs including a first MPDU and a last MPDU each including an indicator bit to indicate whether more data is to be transmitted to the station, and wherein the indicator bit of the first MPDU is set to indicate more data and the indicator bit of the last MPDU is cleared to indicate no additional data is to be transmitted.

Another aspect of the disclosure provides a computer program product for wireless communications. The computer program product generally includes a non-transitory computer-readable medium storing instructions executable by a processor to receive a power save poll (PS-Poll) frame from a station, transmit a media access control (MAC) protocol data unit (MPDU) to the station responsive to the PS-Poll frame, determine if an acknowledgement of the MPDU is received from the station, and prevent a retransmission of the MPDU to the station in the absence of the acknowledgement from the station that the MPDU is received.

Another aspect of the disclosure provides another computer program product for a wireless communications. The computer program product generally includes a non-transitory computer-readable medium storing instructions executable by a processor to receive a power save poll (PS-Poll) frame from a station, transmit an acknowledgement to the station that the PS-Poll frame is received following a short interframe space (SIFS), and transmit a media access control (MAC) protocol data unit (MPDU) to the station responsive to the PS-Poll frame successive to an SIFS after transmission of the acknowledgement to the station.

Still a further aspect of the disclosure provides another computer program product for wireless communications. The computer program product generally includes a non-transitory computer-readable medium storing instructions executable by a processor to receive a power save poll (PS-Poll) frame from a station, and transmit an aggregated media access control protocol data unit (A-MPDU) including a number of aggregated MPDUs to the station responsive to the PS-Poll frame, the number of aggregated MPDUs including a first MPDU and a last MPDU each including an indicator bit to indicate whether more data is to be transmitted to the station, and wherein the indicator bit of the first MPDU is set to indicate more data and the indicator bit of the last MPDU is cleared to indicate no additional data is to be transmitted.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
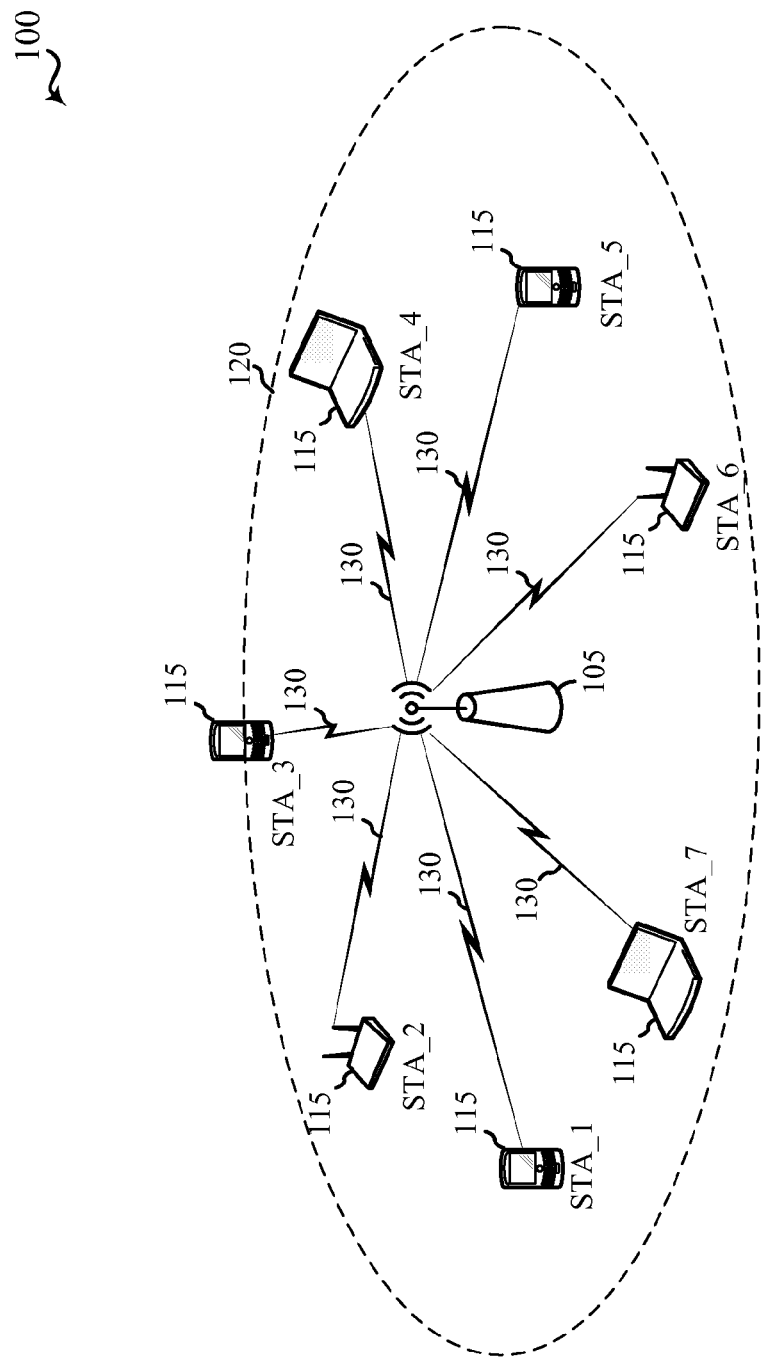
FIG. 1 shows a diagram that illustrates an example of a wireless local area network (WLAN) that supports power conservation modes according to various examples.

Described examples are directed to methods, systems, devices, and apparatuses for power conservation in a wireless communications system that may enhance power conservation through efficient transmissions and acknowledgements of information between an AP and a station. The time between a determination by a station to enter a power saving mode and entering network sleep mode by the station may be reduced through a transmission, by an AP, of a media access control (MAC) protocol data unit (MPDU) to the station successive to a short interframe space (SIFS) after transmission of an acknowledgement to the station of a PS-Poll frame from the station. Transmission of the MPDU after the SIFS following the acknowledgement may reduce the time associated with random backoffs following an acknowledgement of the AP, and may reduce or eliminate the time associated with queue delay, other traffic, or collisions of traffic with another station(s). The time to enter a power saving mode by a station may also be reduced through transmission of aggregated MPDUs (A-MPDUs), with initial MPDUs of an A-MPDU having an indicator bit set to indicate more data and a last MPDU of the A-MPDU having its indicator bit cleared to indicate no additional data is to be transmitted. Efficiencies may further be enhanced through an AP preventing a retransmission of an MPDU to the station in the absence of an acknowledgement from the station that the MPDU is received. In addition to power savings, examples described may also provide, for example, a more efficient usage of the overall wireless medium, thus enhancing medium resources available for other devices, providing a higher throughput, lower wait times for devices to access the medium, and may reduce the amount of collisions in the medium.

The power conservation techniques presented herein are generally described in connection with WLANs for simplicity. A WLAN (or Wi-Fi network) may refer to a network that is based on the protocols described in the various IEEE 802.11 standards (e.g., 802.11a/g, 802.11n, 802.11ac, 802.11ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As used herein, the term "successive to" refers to a second transmission that immediately follows a first transmission. For example, an MPDU that is transmitted "successive to an SIFS after transmission of an acknowledgement" means that the MPDU is transmitted immediately following an SIFS period that immediately follows the termination of the acknowledgement.

Referring first to FIG. 1, a WLAN 100 or Wi-Fi network is shown that is configured to provide enhanced power conservation. The WLAN 100 includes an AP 105 and multiple associated stations 115. In this example, there are shown seven (7) stations or STAs 115, which are identified as STA_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS). The various stations 115 in the BSS are able to communicate with one another through the AP 105. Also shown is a coverage area 120 of the AP 105, which may represent a basic service area (BSA) of the WLAN 100. Although not shown in FIG. 1, the BSS associated with the WLAN 100 is typically connected to a wired or wireless distribution system (DS) that allows multiple APs to be connected in an extended service set.

The AP 105 is configured to communicate bi-directionally with each of the stations 115 using transmissions 130. The transmissions 130 may include downlink transmissions (e.g., beacon frames) that are sent from the AP 105 to a station 115 as well as uplink transmissions (e.g., acknowledgements or ACK frames) that are sent from a station 115 to the AP 105. Typically, the AP 105 is configured to broadcast its downlink transmissions to the stations 115 that are within the coverage area 120. In situations where a station 115 does not expect to actively transmit or receive data, it may be beneficial for the station 115 to power down certain of its components, such as radio components, in order to reduce power consumption of the station. Various wireless standards, such as the 802.11 standards, define a power-save mode for stations 115. In power-save mode, a station 115 may choose to enter a network sleep mode for a beacon interval(s), waking periodically to receive beacon frames that include a delivery traffic indication message (DTIM). In some implementations, a DTIM may be transmitted periodically in beacon frames, such as, for example, every other beacon frame, and a station 115 in network sleep mode may awaken to receive every other beacon frame but otherwise remain asleep and may thereby reduce power consumption. To initiate a power-save mode, a station 115 may transmit a notification to the AP 105, so that the AP 105 will know how to handle data traffic destined for the station 115. In some examples, the AP 105 and a station of the stations 115 may be configured to implement communications related to entry of a power save mode by the station.

Figure 2:
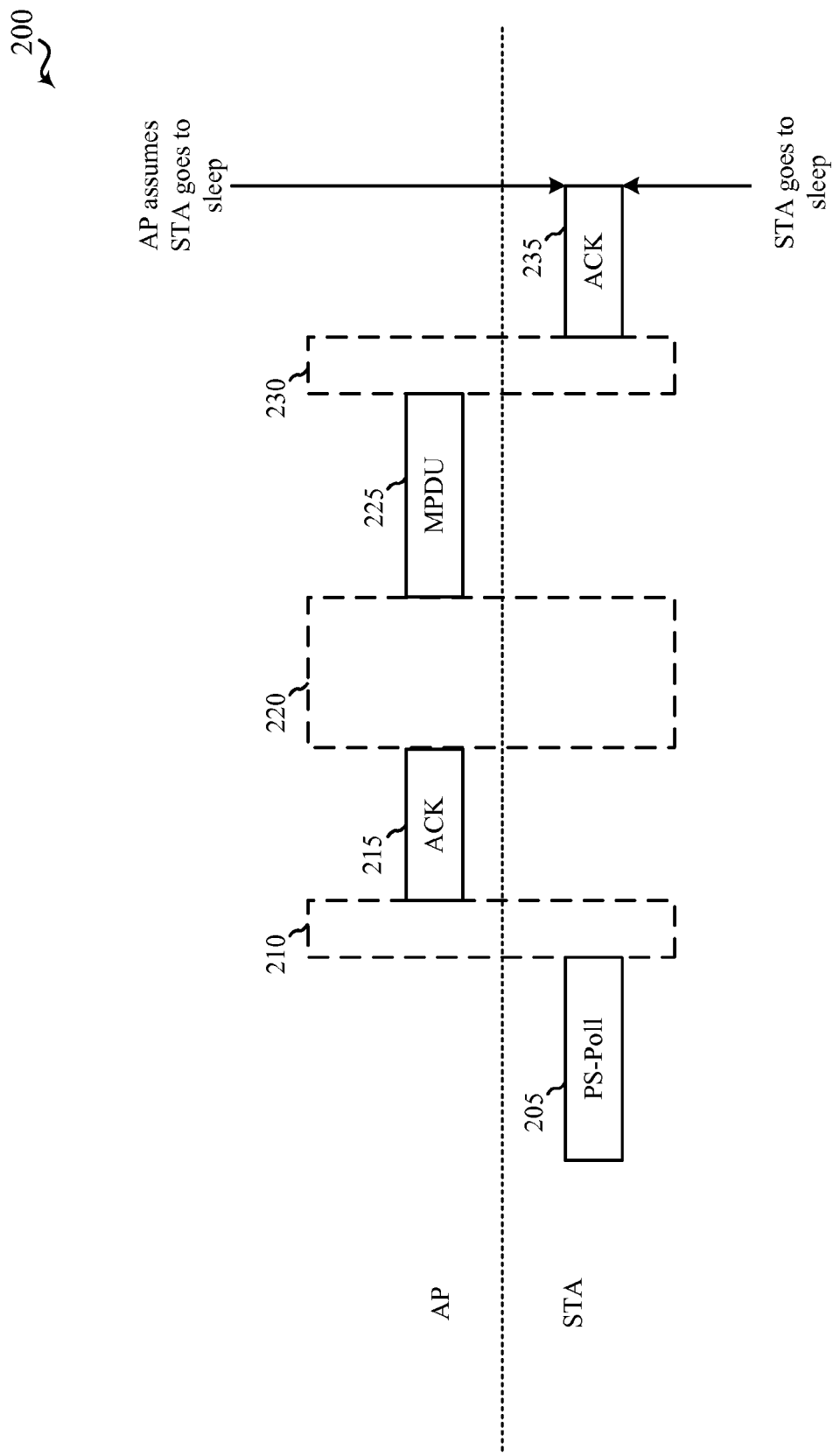
FIG. 2 shows a diagram that illustrates an example of a frame exchange between an AP and a station entering a power save mode according to various examples.

With reference now to FIG. 2, an example 200 of transmissions between a station and an AP, such as between a station 115 and AP 105 of FIG. 1, according to traditional power saving mode techniques is described. In this example, a station at some point determines that it should enter into a power save mode. Such a determination may be made, for example, based on a state of a transmit data queue of the station, recent activity of the station, or power saving preferences set for the station, to name but a few examples. After the station has entered power save mode, it may determine that there is data pending for it at the AP. Such a determination may be based on, for example, a "TIM bit" which may be set in the beacon sent out by the AP. In order to retrieve that data, but still remaining in a Wi-Fi protocol based power save state, the station may transmit a power-save polling (PS-Poll) frame 205 to the AP. The AP, following a short interframe space (SIFS) 210 may transmit an acknowledgement 215 that acknowledges the receipt of the PS-Poll frame. Following a DCF interframe space (DIFS) and a random backoff (RBO) 220, the AP may transmit a single MPDU 225 in response to the PS-Poll frame 205. Following an SIFS 230, the station may transmit an acknowledgement 235 that the MPDU 225 was received.

At this point, the AP assumes that the station has gone back into a network sleep mode, and the station may go into network sleep mode. According to various implementations, the duration of the DIFS and RBO on average is approximately 110 μsec. Additionally, other factors may also cause delays in a station entering network sleep mode. For example, queue delays within the AP may result in a delay of the transmission of MPDU 225 by the AP, and reception of MPDU 225 by the STA. Such a queue delay may occur, for example, when another station receives an MPDU or an aggregated MPDU (A-MPDU) from the AP, which was queued to be transmitted before the MPDU 225. Such a queue delay may result in a delayed entry by the station into network sleep mode, and thus result in increased power consumption relative to a case that experiences no queue delay. Another factor that may delay a station from entering network sleep mode is traffic from another station that may be transmitted following lower RBO. The AP would then be delayed in transmitting MPDU 225, which would in turn delay the station from entering network sleep mode. A further factor that may delay a station from entering network sleep mode is a collision between the AP transmitted MPDU 225 and a transmission of another station. Such a situation results in a retransmission of the MPDU 225 following an increased RBO, potentially with a reduced data rate. Thus, such a situation may also delay the station from entering network sleep mode.

Figure 3:
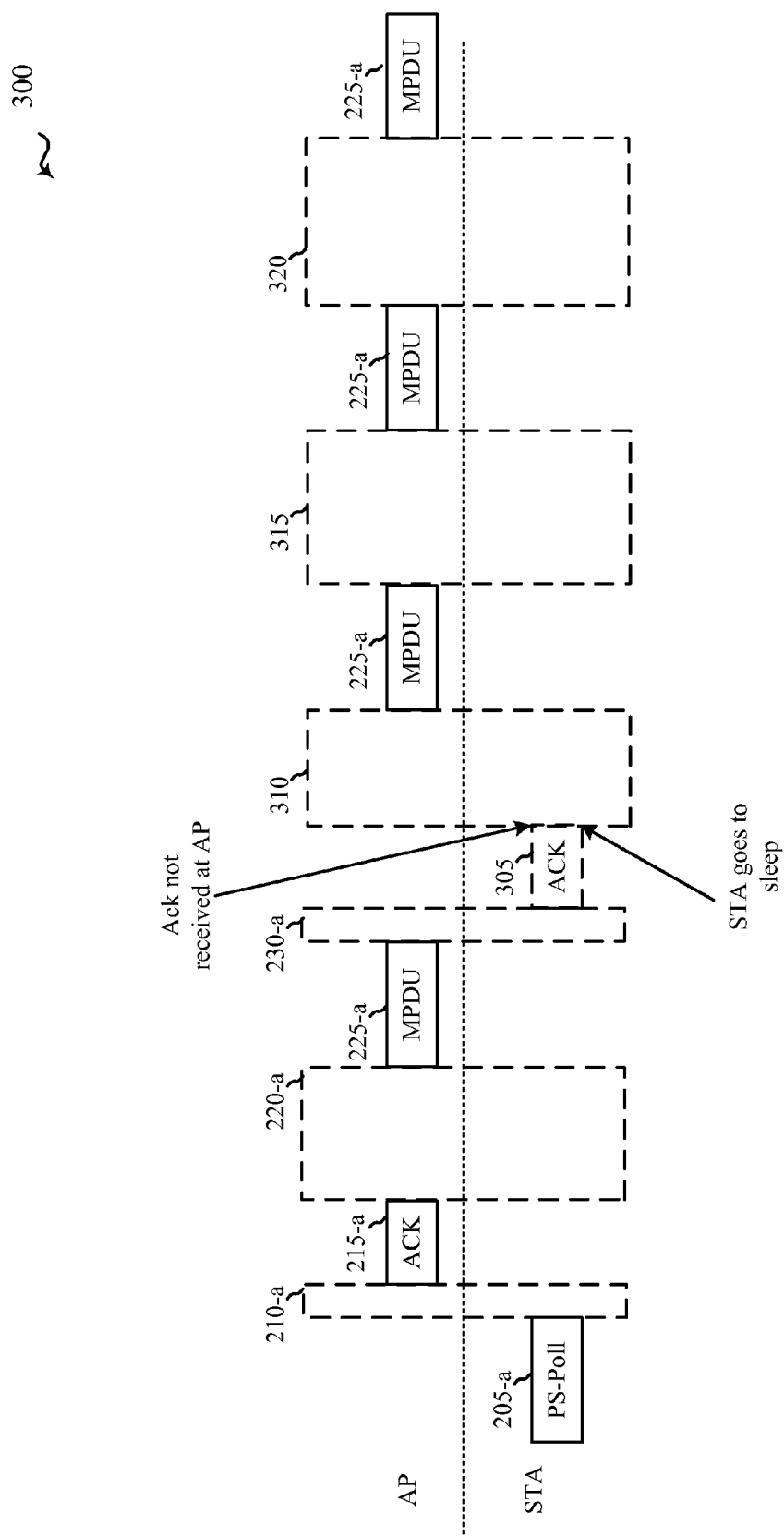
FIG. 3 shows a diagram that illustrates another example of an exchange between an AP and a station entering a power save mode according to various examples.

With reference now to FIG. 3, an example 300 of transmissions between a station and an AP, such as between a station 115 and AP 105 of FIG. 1, according to various examples is described. In this example, a station makes a determination to enter into a power save mode. As mentioned above, such a determination may be made based on a number of factors at the station. After the station has entered power save mode, it may determine that there is data pending for it at the AP, similarly as described above with respect to FIG. 2. In order to retrieve that data while maintaining a power save state, the station may transmit a PS-Poll frame 205-a to the AP. The AP, following SIFS 210-a may transmit an acknowledgement 215-a that acknowledges the receipt of the PS-Poll frame, also similarly as described with respect to FIG. 2. Following a DIFS and RBO 220-a, the AP may transmit a single MPDU 225-a in response to the PS-Poll frame 205-a. Following an SIFS 230-a, the station may transmit an acknowledgement 305 that the MPDU 225-a was received.

Circumstances may arise, however, which may prevent the acknowledgement 305 from being received at the AP. For example, interference may result in the AP being unable to properly receive the acknowledgement 305. The station, however, having sent the acknowledgement 305 may enter into network sleep mode. The AP, following a timeout period 315, may retransmit MPDU 225-a. The station, having entered network sleep mode, does not receive the retransmitted MPDU 225-a, and the AP thus does not receive an acknowledgement again. The AP, in this example, retransmits MPDU 225-a after period 310, which is an increased backoff period with respect to period 310. According to the example of FIG. 3, the station again would not transmit an acknowledgement, resulting in the AP again retransmitting the MPDU 225-a following period 320 which has an increased backoff period as compared to period 315.

According to some examples, the AP may discontinue sending retransmissions of the MPDU following a limited number of MPDUs after the PS-Poll frame. Such a limit on retransmissions may save some network and AP resources, as compared to implementations where retransmissions are attempted until an acknowledgement is received. Additionally, according to some examples, a data transmission rate for the station may remain unadjusted in the absence of the acknowledgement from the station that the MPDU is received, based on the assumption that the station may be in sleep mode. In some other cases, the AP may transmit at unadjusted data rate for a limited number of attempts, and then adjust the data rate for a subsequent transmission(s) of an MPDU. In some examples, the AP and station may communicate on a busy or noisy channel, which may result in the station being unable to receive transmissions at the unchanged rate, and it may be determined that the lack of an acknowledgement is a result of the channel conditions or is a result of a collision with another station(s) communicating with the AP. In such cases, the retransmission of MPDU 225-a may be performed using an adjusted data rate or with a different backoff period applied. Adjusting the data transmission rate may be accomplished, for example, through an update to a rate adaptation table at the AP.

Figure 4:
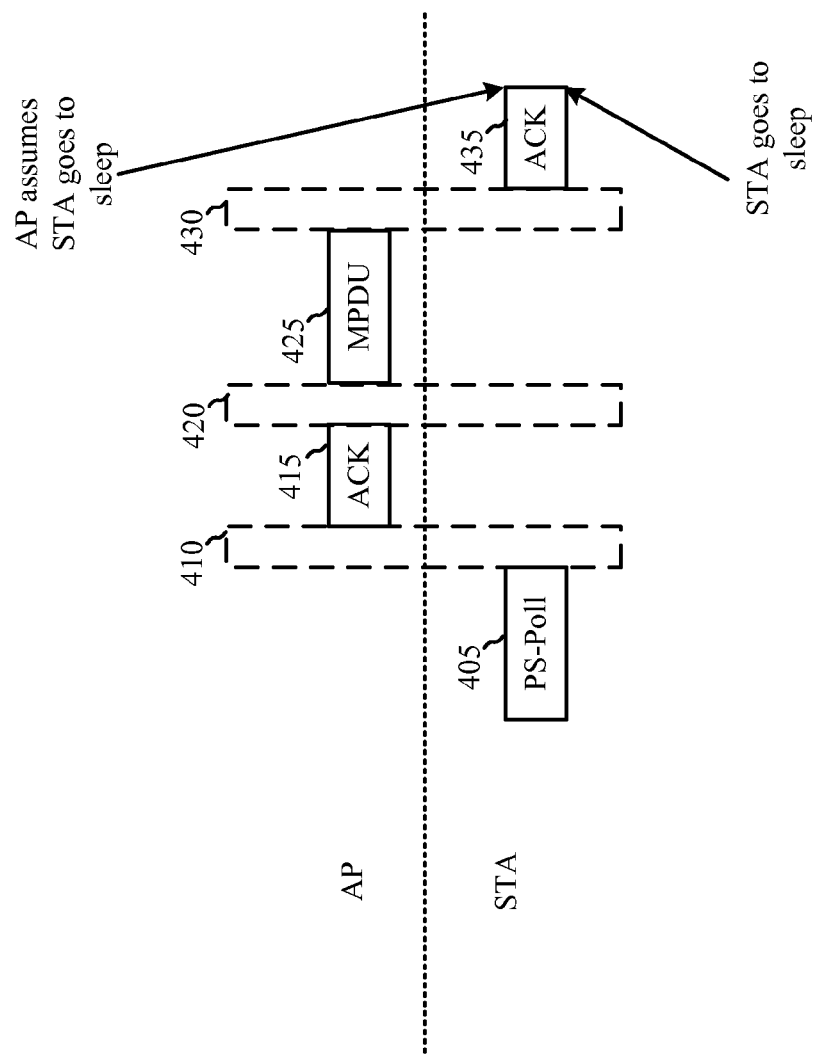
FIG. 4 shows a diagram that illustrates an example of transmissions between an AP and a station entering a power save mode according to various examples.

With reference now to FIG. 4, an example 400 of transmissions between a station and an AP, such as between a station 115 and AP 105 of FIG. 1, according to power saving techniques of various examples is described. In this example, a station determines that it should enter into a power save mode. Such a determination may be made as discussed above, according to a factor(s) at the station. After the station has entered power save mode, it may determine that there is data pending for it at the AP, similarly as described above with respect to FIG. 2. In order to retrieve that data while maintaining a power save state, the station may transmit a PS-Poll frame 405 to the AP. The AP, following SIFS 410 may transmit an acknowledgement 415 that acknowledges the receipt of the PS-Poll frame. In the example of FIG. 4, instead of waiting for a DCF interframe space (DIFS) and a random backoff (RBO) periods, the AP waits only for an SIFS 420, and transmits MPDU 425. That is, the AP transmits MPDU 425 successive to SIFS 420 without waiting for the DIFS and RBO times after the transmission of the acknowledgement 415 to the station. Following another SIFS 430, the station may transmit an acknowledgement 435 that the MPDU 425 was received. At this point, the AP assumes that the station has gone to network sleep mode, and the station may go into network sleep mode. During the time that the AP is transmitting acknowledgement 415, a module of the AP may prepare the MPDU 425 for transmission such that the MPDU 425 is set to be transmitted successive to SIFS 420. In such a manner, the time for the station to enter network sleep is reduced, thus enhancing power savings at the station. In cases where the DIFS and RBO times are reduced, the station may enter network sleep mode, according to some examples, approximately 100 µs sooner. However, in cases where additional delay may be present, such as queue delays, other traffic delays, and/or collision delays, the time for the station to enter network sleep may be more significantly reduced, thus further enhancing power savings.

Figure 5:
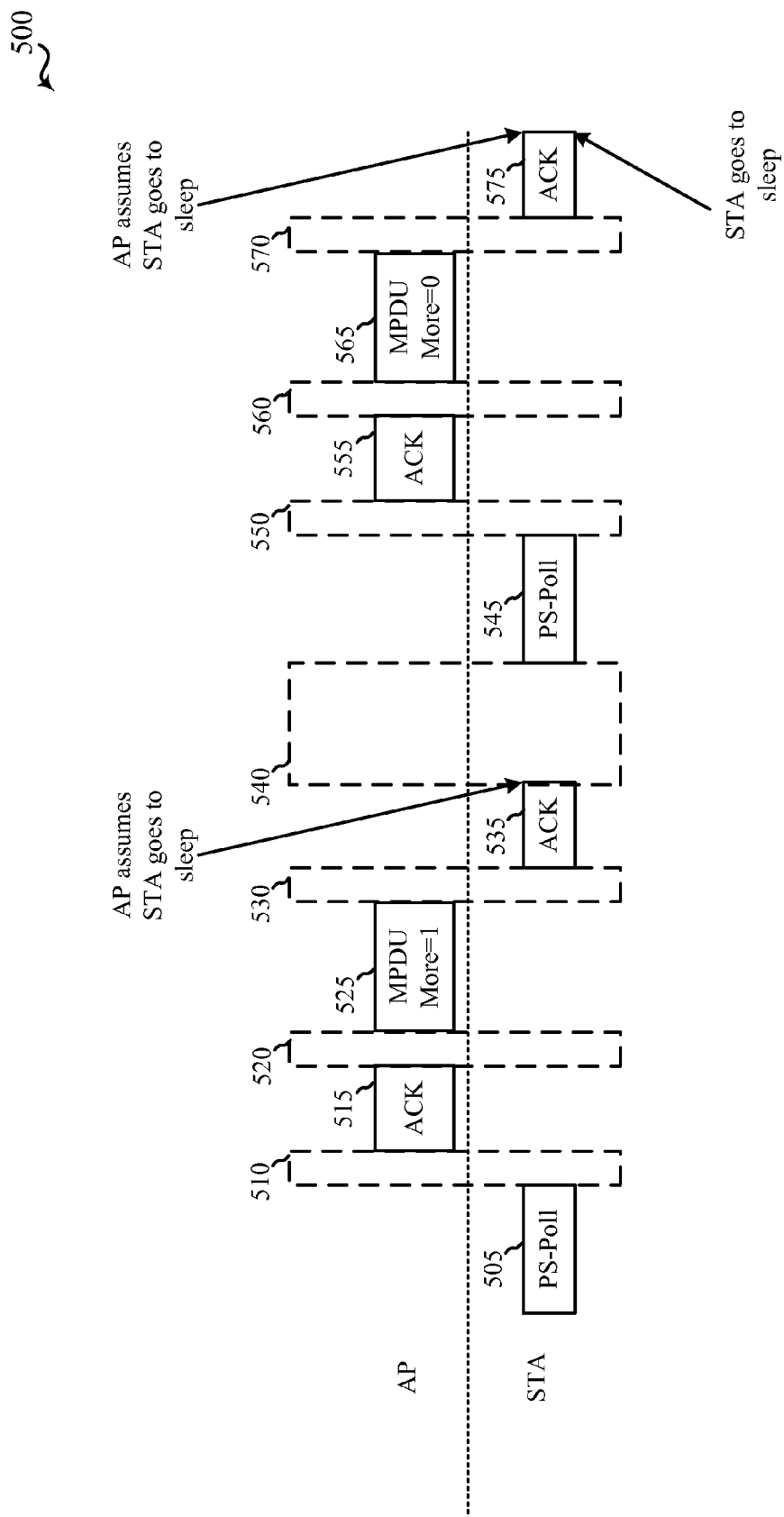
FIG. 5 shows a diagram that illustrates another example of transmissions between an AP and a station entering a power save mode according to various examples.

In some examples, an AP may have additional data in its buffered data queue to be transmitted to the station than may be transmitted in a single MPDU. With reference now to FIG. 5, another example 500 of transmissions between a station and an AP, such as between a station 115 and AP 105 of FIG. 1, according to power saving techniques of various examples is described. In this example, a station determines that it should enter into a power save mode. Such a determination may be made as discussed above, according to a factor(s) at the station. After the station has entered power save mode, it may determine that there is data pending for it at the AP, similarly as described above with respect to FIG. 2. In order to retrieve that data while maintaining a power save state, the station may transmit a PS-Poll frame 505 to the AP. The AP, following SIFS 510 may transmit an acknowledgement 515 that acknowledges the receipt of the PS-Poll frame. In the example of FIG. 5, the AP waits only for the SIFS 520, and transmits MPDU 525. The MPDU 525 may include an indicator bit to indicate that more data is to be transmitted to the station following the transmission of the MPDU 525. Such an indicator bit may be referred to as a "more bit" and may be set or cleared based on the status of the buffered data queue at the AP.

Following an SIFS 530, the station may transmit an acknowledgement 535 that the MPDU 525 was received. At this point, the AP assumes that the station has gone to network sleep mode, although the station, based on the more bit of the MPDU 525, may not enter into sleep mode. In the example of FIG. 5, the station, following period 540, transmits a second PS-Poll frame 545. The AP, following SIFS 550 may transmit an acknowledgement 555 that acknowledges the receipt of the second PS-Poll frame 545. The AP again waits only for the SIFS 560, and transmits MPDU 565. If the buffered data queue at the AP does not include any additional data for the station, the more bit of MPDU 565 may be cleared. Following an SIFS 570, the station may transmit an acknowledgement 575 that the MPDU 565 was received. At this point, the AP assumes that the station has gone to network sleep mode, and the station may go into network sleep mode.

Figure 6:
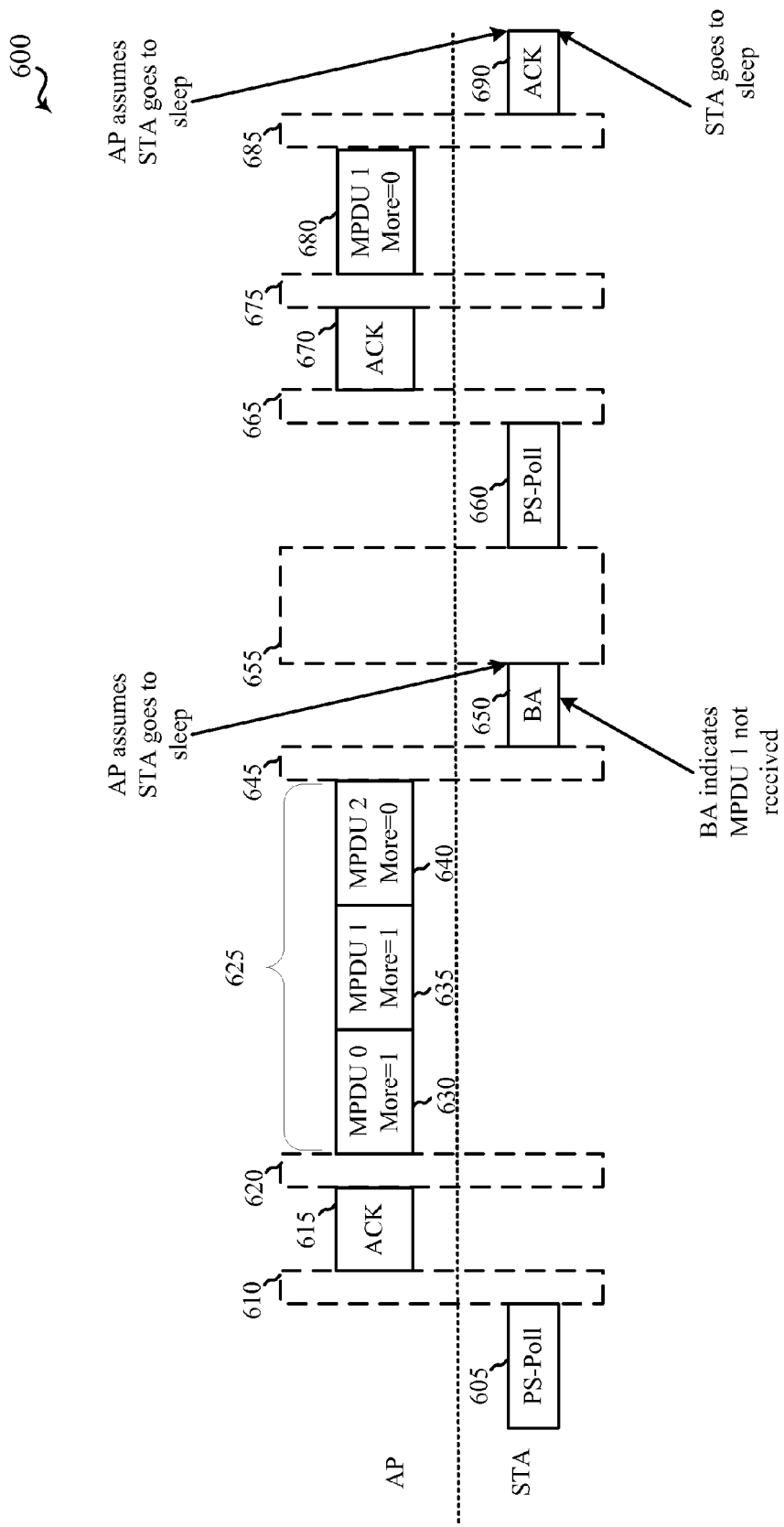
FIG. 6 shows a diagram that illustrates another example of transmissions between an AP and a station entering a power save mode according to various examples.

In some examples, rather than transmitting a single MPDU, an AP may transmit an aggregated MPDU (A-MPDU). Such an A-MPDU may include multiple MPDUs transmitted sequentially by the AP. With reference now to FIG. 6, another example 600 of transmissions between a station and an AP, such as between a station 115 and AP 105 of FIG. 1, according to power saving techniques of various examples is described. In this example, a station determines that it should enter into a power save mode. Such a determination may be made as discussed above, according to a factor(s) at the station. After the station has entered power save mode, it may determine that there is data pending for it at the AP, similarly as described above with respect to FIG. 2. In order to retrieve that data while maintaining a power save state, the station may transmit a PS-Poll frame 605 to the AP. The AP, following an SIFS 610 may transmit an acknowledgement 615 that acknowledges the receipt of the PS-Poll frame. In the example of FIG. 6, the AP waits only for the SIFS 620, and transmits an A-MPDU 625. The A-MPDU 625 may include a number of MPDUs 630, 635, 640 transmitted sequentially from the AP. In the example of FIG. 6, the first two MPDUs 630, 635 of A-MPDU 625 have a more bit that is set, and the last MPDU 640 has a more bit which is cleared to indicate that no more data is to be transmitted by the AP to the station following the transmission of the A-MPDU 625. In other examples, all of the more bits of A-MPDU 625 may be set to indicate that the buffered data queue at the AP still contains additional data, which the AP could send to the STA when the STA request it to do so, with, for example, a PS-POLL frame.

Following an SIFS 645, the station may transmit a block acknowledgement (BA) 650 indicating which MPDUs 630, 635, 640 of A-MPDU 625 are properly received. Such a BA 650 may include, according to some implementations, a starting MPDU sequence number and a bitmap of a pre-defined number of prior sequence numbers, with bits of the bitmap set or cleared to indicate which sequence numbers have been properly received at the station. In the example of FIG. 6, the BA 650 may indicate that MPDU 635 was not received. At this point, the AP assumes that the station has gone to network sleep mode, although the station, based on a status of its receive queue indicating that MPDU 635 was not properly received, may not enter into sleep mode. In the example of FIG. 6, the station, following period 655, transmits a second PS-Poll frame 660. The AP, following SIFS 665 may transmit an acknowledgement 670 that acknowledges the receipt of the second PS-Poll frame 660. The AP again waits only for the SIFS 675, and transmits MPDU 680. MPDU 680 may contain data initially attempted to be transmitted in MPDU 635. If the buffered data queue at the AP does not include any additional data for the station, the more bit of MPDU 680 may not be set. Following an SIFS 685, the station may transmit an acknowledgement 690 that the MPDU 680 was received. At this point, the AP assumes that the station has gone to network sleep mode, and the station may go into network sleep mode knowing that there is no more data pending at the AP.

Figure 7:
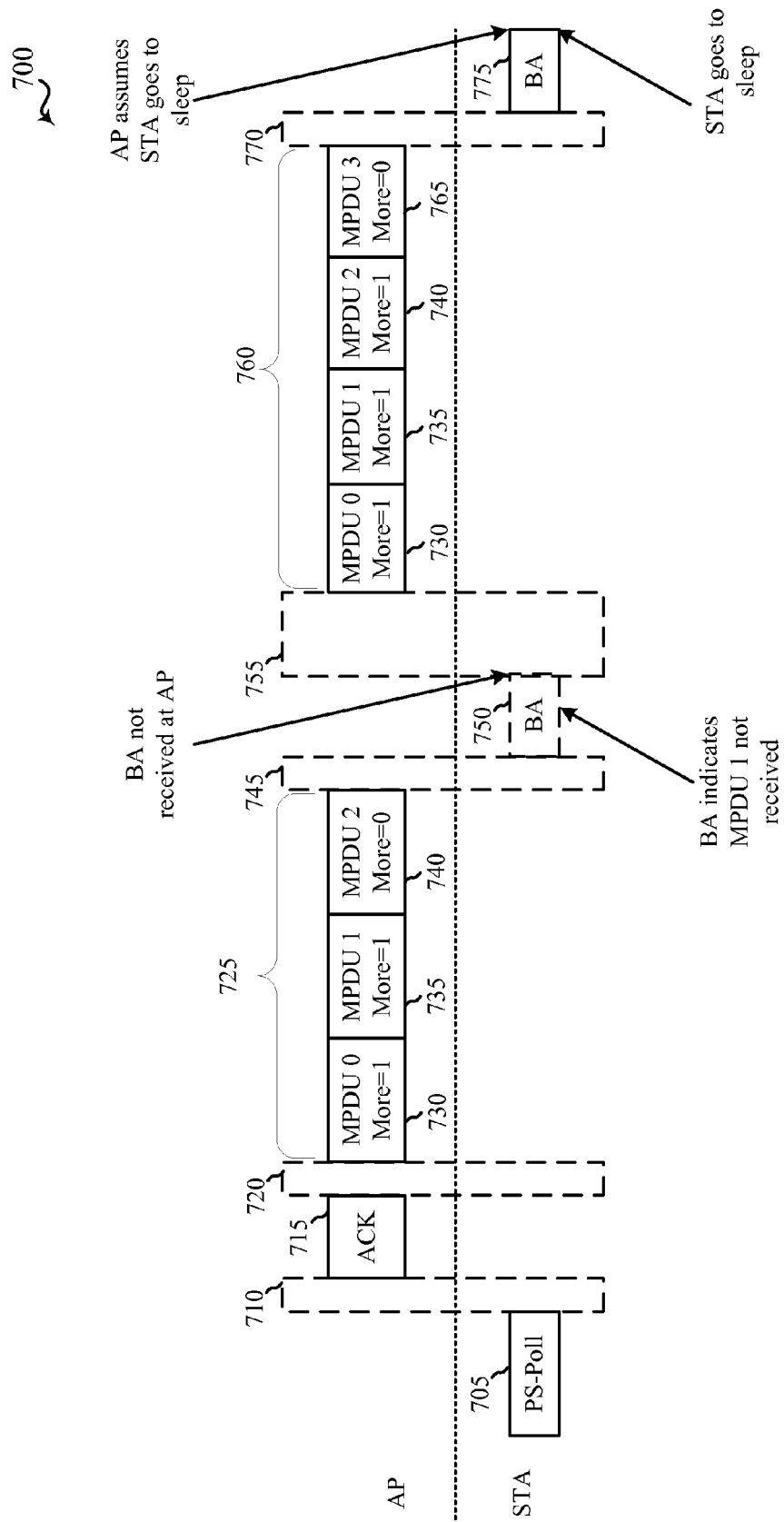
FIG. 7 shows a diagram that illustrates another example of transmissions between an AP and a station entering a power save mode according to various examples.

In some cases, the AP may not properly receive a BA from a station, and may retransmit an A-MPDU following a random backoff period. Similarly as discussed above with respect to FIG. 3, if, after a limited number of re-transmits, no BA is received the AP may in some examples assume that the station was asleep and makes no change to the rate table. In some examples, however, additional data may be received at the AP for transmission to the station. According to some examples, additional MPDUs may be added to a re-transmitted A-MPDU. With reference now to FIG. 7, an example 700 of retransmissions between a station and an AP that may include additional MPDUs is described. Such transmissions may be between, for example, a station 115 and AP 105 of FIG. 1. In this example, a station initially determines that it should enter into a power save mode. After the station has entered power save mode, it may determine that there is data pending for it at the AP, similarly as described above with respect to FIG. 2. In order to retrieve that data while maintaining a power save state, the station may transmit a PS-Poll frame 705 to the AP. The AP, following an SIFS 710 may transmit an acknowledgement 715 that acknowledges the receipt of the PS-Poll frame. In the example of FIG. 7, the AP waits only for the SIFS 720, and transmits an A-MPDU 725. The A-MPDU 725 may include a number of MPDUs 730, 735, 740 transmitted sequentially from the AP. In the example of FIG. 7, the first two MPDUs 730, 735 of A-MPDU 725 have a more bit that is set, and the last MPDU 740 has a more bit this is cleared, to indicate that no more data is to be transmitted to the station following the transmission of the A-MPDU 725.

Following an SIFS 745, the station may transmit a BA 750 indicating which MPDUs 730, 735, 740 of A-MPDU 725 are properly received. In the example of FIG. 7, the BA 750 may indicate that MPDU 735 was not received. Circumstances may arise, however, which may prevent the BA 750 from being received at the AP. For example, interference may result in the AP being unable to properly receive the BA 750. The AP, in the example of FIG. 7, may have received additional data for the station. In such a case, the AP, following a timeout period 755, may transmit A-MPDU 760. The A-MPDU 760 may include retransmissions of MPDUs 730, 735, and 740 transmitted sequentially from the AP, as well as MPDU 765, which includes the additional data received at the AP. In other examples, BA 750 may be properly received by the AP, but the station may send another PS-Poll frame to the AP in order to retrieve the missing frame as indicated by the BA, at which point the AP may add MPDU 765 in the subsequent A-MPDU. In the example of FIG. 7, the first three MPDUs 730, 735, and 740 of A-MPDU 760 have a more bit that is set, and the last MPDU 765 has a more bit this is cleared, indicate that more data is to be transmitted to the station following the transmission of the A-MPDU 760. Following an SIFS 770, the station may transmit a BA 775 that the A-MPDU 760 was received. At this point, the AP assumes that the station has gone to network sleep mode, and the station may go into network sleep mode. In some cases, the BA 775 may indicate that an MPDU of MPDUs 730, 735, 740, and 765 were not properly received, at which point the station may transmit another PS-Poll frame in a similar manner as discussed above with respect to FIG. 6.

Figure 8:
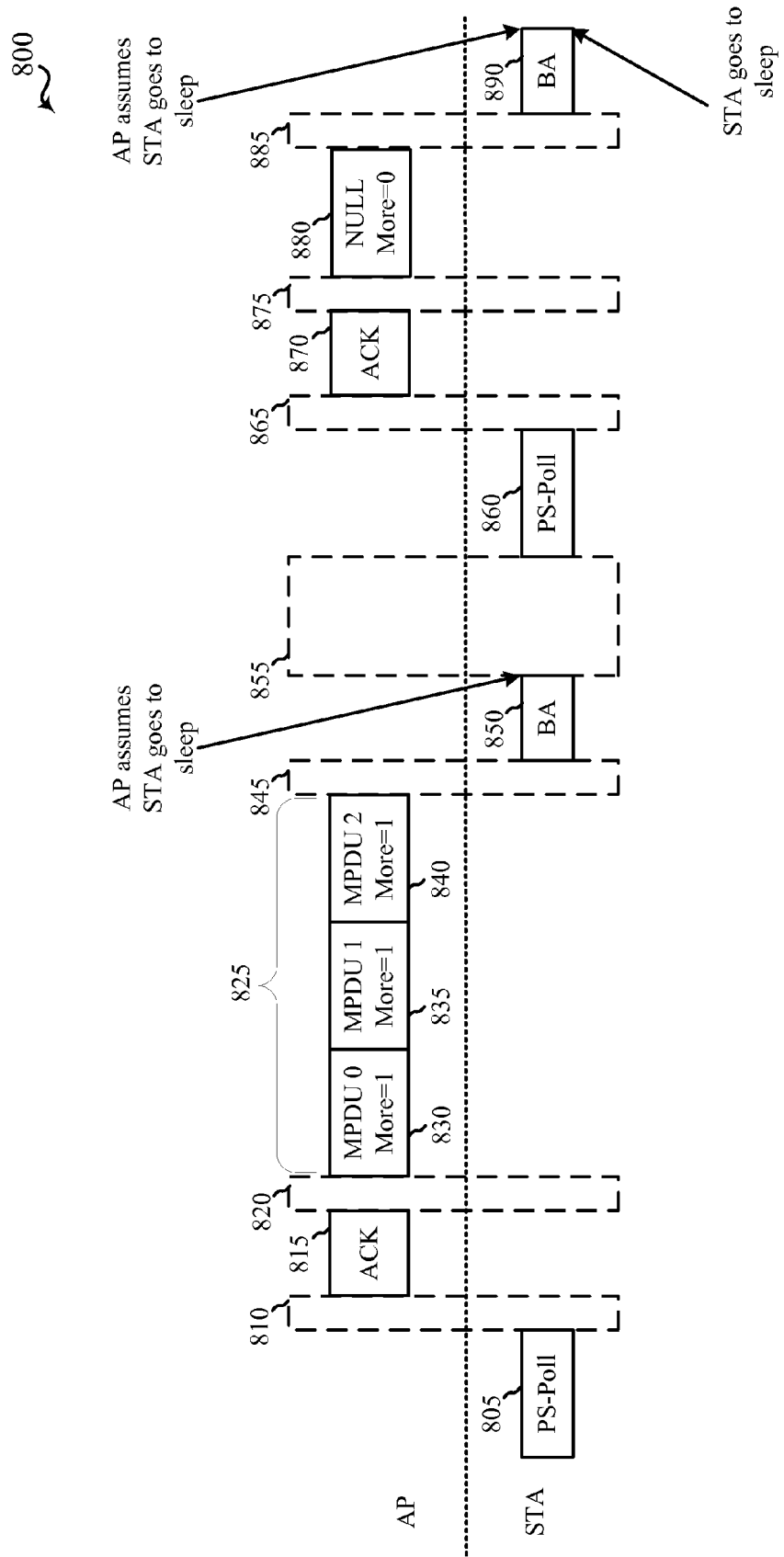
FIG. 8 shows a diagram that illustrates another example of transmissions between an AP and a station entering a power save mode according to various examples.

In some implementations, a station may not be configured to recognize that different MPDUs in an A-MPDU may contain different values for more bits. In some examples, an AP may recognize that the station does not have such capability, and may always set the more bits in an A-MPDU to the same value. With reference now to FIG. 8, another example 800 of A-MPDU transmissions between a station and an AP, such as between a station 115 and AP 105 of FIG. 1, according to power saving techniques of various examples is described. In this example, a station determines that it should enter into a power save mode. After the station has entered power save mode, it may determine that there is data pending for it at the AP, similarly as described above with respect to FIG. 2. In order to retrieve that data while maintaining a power save state, the station may transmit a PS-Poll frame 805 to the AP. The AP, following an SIFS 810 may transmit an acknowledgement 815 that acknowledges the receipt of the PS-Poll frame. In the example of FIG. 8, the AP waits only for the SIFS 820, and transmits an A-MPDU 825. The A-MPDU 825 may include a number of MPDUs 830, 835, 840 transmitted sequentially from the AP. In the example of FIG. 8, the buffered data queue of AP may be empty following the transmission of MPDU 840, but the AP may recognize that the station is not configured to recognize different values of more bits in A-MPDU 825. Thus, each of the MPDUs 830, 835 and 840 of A-MPDU 825 has a more bit that is set. Following an SIFS 845, the station may transmit a BA 850 indicating that all MPDUs 830, 835, 840 of A-MPDU 825 are properly received. At this point, the AP assumes that the station has gone to network sleep mode, although the station, based on the value of the more bits of A-MPDU 825, may not enter into sleep mode. In the example of FIG. 8, the station, following period 855, transmits a second PS-Poll frame 860. The AP, following SIFS 865 may transmit an acknowledgement 870 that acknowledges the receipt of the second PS-Poll frame 860. The AP again waits only for the SIFS 875, and transmits a null data frame 880 having a more bit that is not set. Following an SIFS 885, the station may transmit an acknowledgement 890 that the null data frame 880 was received. At this point, the AP assumes that the station has gone to network sleep mode, and the station may go into network sleep mode.

Figure 9:
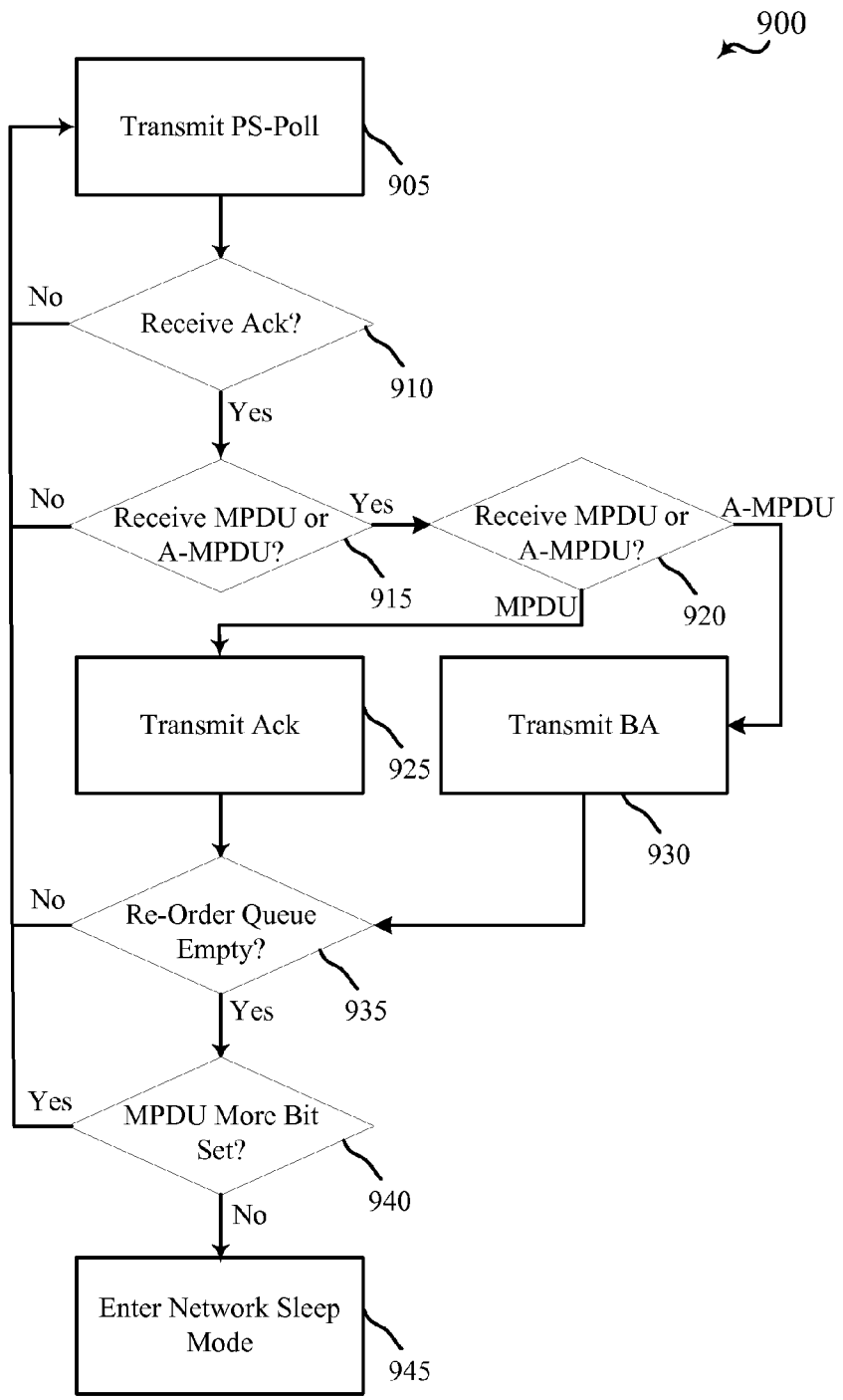
FIG. 9 is a flowchart of an example of operations related to entering power save mode for a station according to various examples.

With reference now to FIG. 9, a flow diagram of a method 900 for power conservation at a station is discussed in accordance with various examples. The method 900 may be implemented using, for example, the stations 115 of FIG. 1. At block 905, the station transmits a PS-Poll frame. At block 910, the station determines if an acknowledgement of the PS-Poll frame is received. If an acknowledgement is not received, the station may transmit the PS-Poll frame again, as indicated at block 905. If the station does receive an acknowledgement, the station then determines if an MPDU or A-MPDU is received. If an MPDU or A-MPDU is not received within a timeout period, the station may transmit another PS-Poll frame, as indicated at block 905, or in some examples may simply enter network sleep mode. If an MPDU or A-MPDU is received at block 915, the station determines an ACK policy, which can be ACK or BA, according to block 920. For a single MPDU, this is typically ACK, and for A-MPDU this is typically BA, but not always. In the case of the acknowledgement policy being an ACK policy, an acknowledgement may be transmitted, according to block 925. In the case of a BA policy, the station may transmit a BA, according to block 930. At block 935, the station determines if the re-order queue at the station is empty. If the re-order queue is not empty, operations continue at block 905. If the re-order queue is empty, the station determines if an MPDU more bit was set in the received MPDU or more bit was set in the last received MPDU of the A-MPDU, as indicated at block 940. If the more bit was set, operations may continue at block 905. Similarly, as discussed above, in some configurations, a station may be able to identify if a more bit is set or cleared in different MPDUs of an A-MPDU. If it is determined that the more bit is not set, the station enters network sleep mode, as indicated at block 945.

Figure 10:
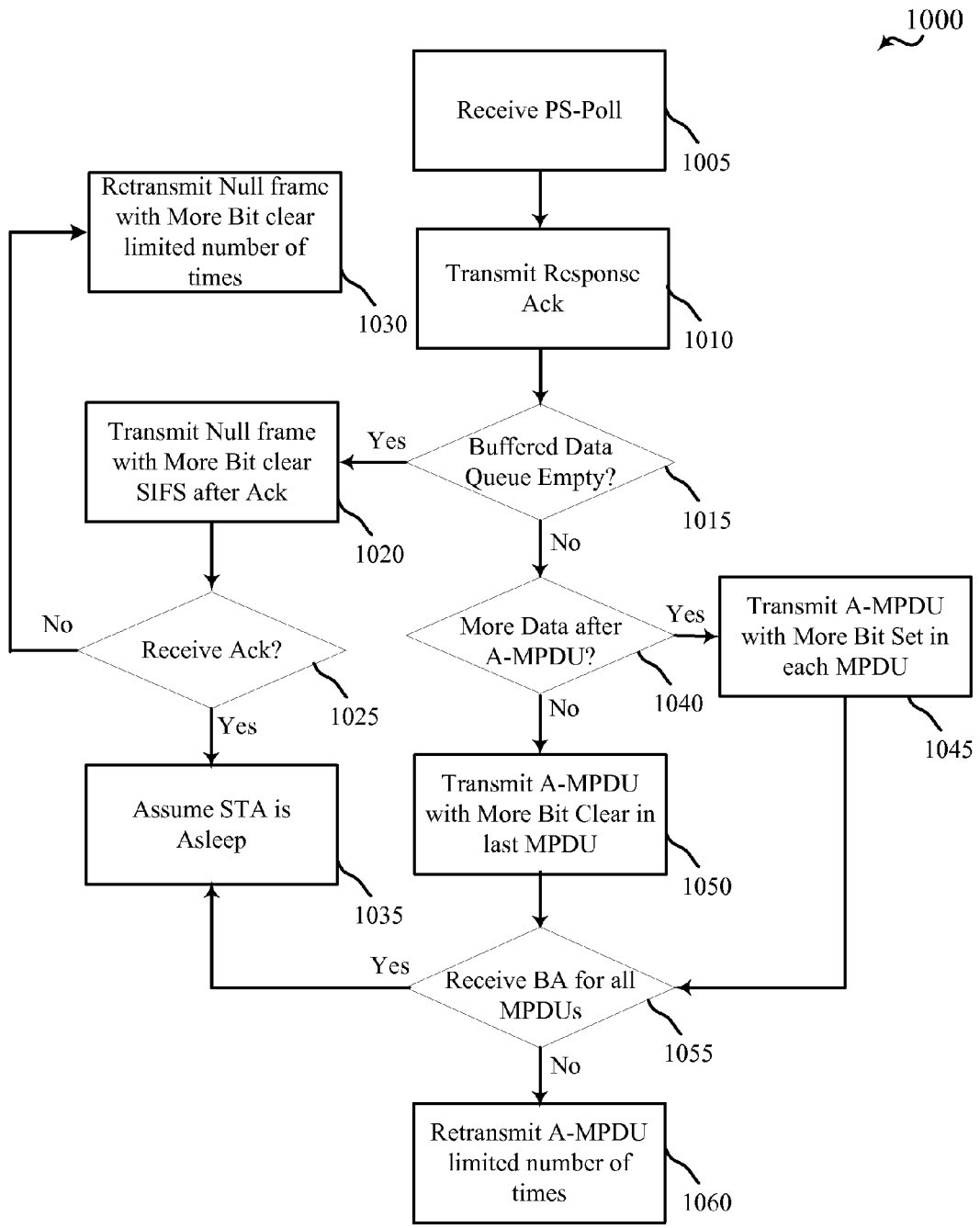
FIG. 10 is a flowchart of an example of operations related to entering power save mode for an AP according to various examples.

Turning now to FIG. 10, a flow diagram of a method 1000 for power conservation at an AP is discussed in accordance with various examples. The method 1000 may be implemented using, for example, the APs 105 of FIG. 1. At block 1005, the AP receives a PS-Poll frame. At block 1010, the AP transmits an acknowledgement of the PS-Poll frame. The AP then determines, at block 1015, whether the buffered data queue for the station is empty. If the buffered data queue is empty, the AP transmits a null frame with the more bit cleared following an SIFS period after transmission of the acknowledgement, as indicated at block 1020. At block 1025, the AP determines if an acknowledgement is received. If an acknowledgement is not received, the AP station may retransmit, at block 1030, the null frame a limited number of times, similarly as discussed above. If an acknowledgement is received at block 1025, the AP may assume that the station is asleep, as indicated at block 1035. If, at block 1015, the buffered data queue is not empty, the AP, at block 1040, determines if more data is present after an A-MPDU is transmitted to the station. If more data is present, the AP may transmit an A-MPDU with more bits set for each MPDU of the A-MPDU, as indicated at block 1045. In some examples, the AP may also determine that the station may not be configured to distinguish that different MPDUs of an A-MPDU may have different values for a more bit, and may set all of the more bits of the MPDUs of the A-MPDU. If it is determined that the buffered data queue will be empty following transmission of an A-MPDU, the AP may transmit an A-MPDU with the more bit of the last MPDU cleared, as indicated at block 1050. As noted above, in cases where a station may not recognize different more bit values in an A-MPDU, block 1055 may be skipped. At block 1055, it is determined whether a BA is received for all of the MPDUs. If a BA is received, the AP may assume that the station is asleep, according to block 1035. If the BA is not received, the AP may retransmit the A-MPDU a limited number of times, as indicated at block 1060. Retransmissions may be performed in a similar manner as discussed above, for example.

Figure 11:
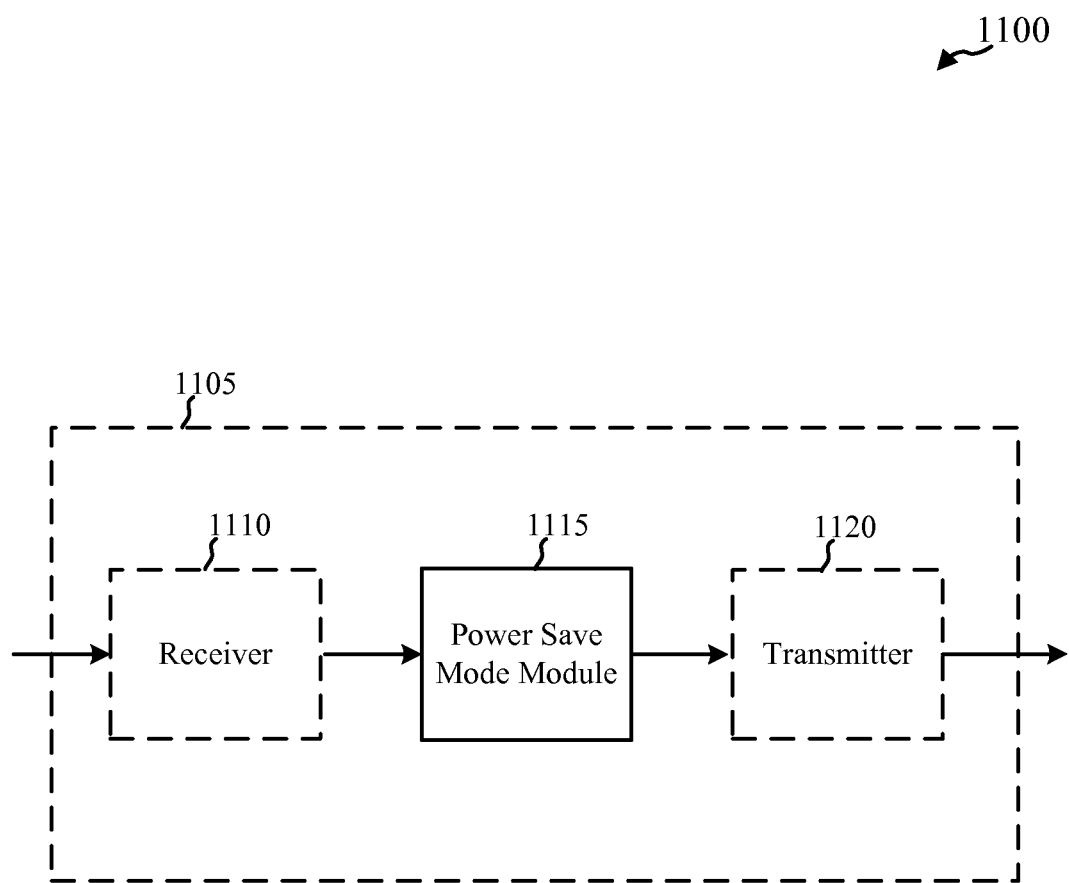
FIG. 11 shows a block diagram that illustrates an example of a power saving mode architecture according to various examples.

With reference now to FIG. 11, a block diagram illustrates a device 1100 that may be used in power conservation of various examples. The device 1100 may be an example of various aspects of the APs 105 or stations 115 described with reference to FIG. 1. The device 1100, or portions of it, may also be a processor. The device 1100 may include a receiver 1110, a power save mode module 1115, and/or a transmitter 1120. Each of these components may be in communication with each other. The device 1100, through the receiver 1110, the power save mode module 1115, and/or the transmitter 1120, may be configured to transmit and receive transmissions for entering a power save mode, similarly as discussed above with respect to FIGS. 2-10.

Figure 12:
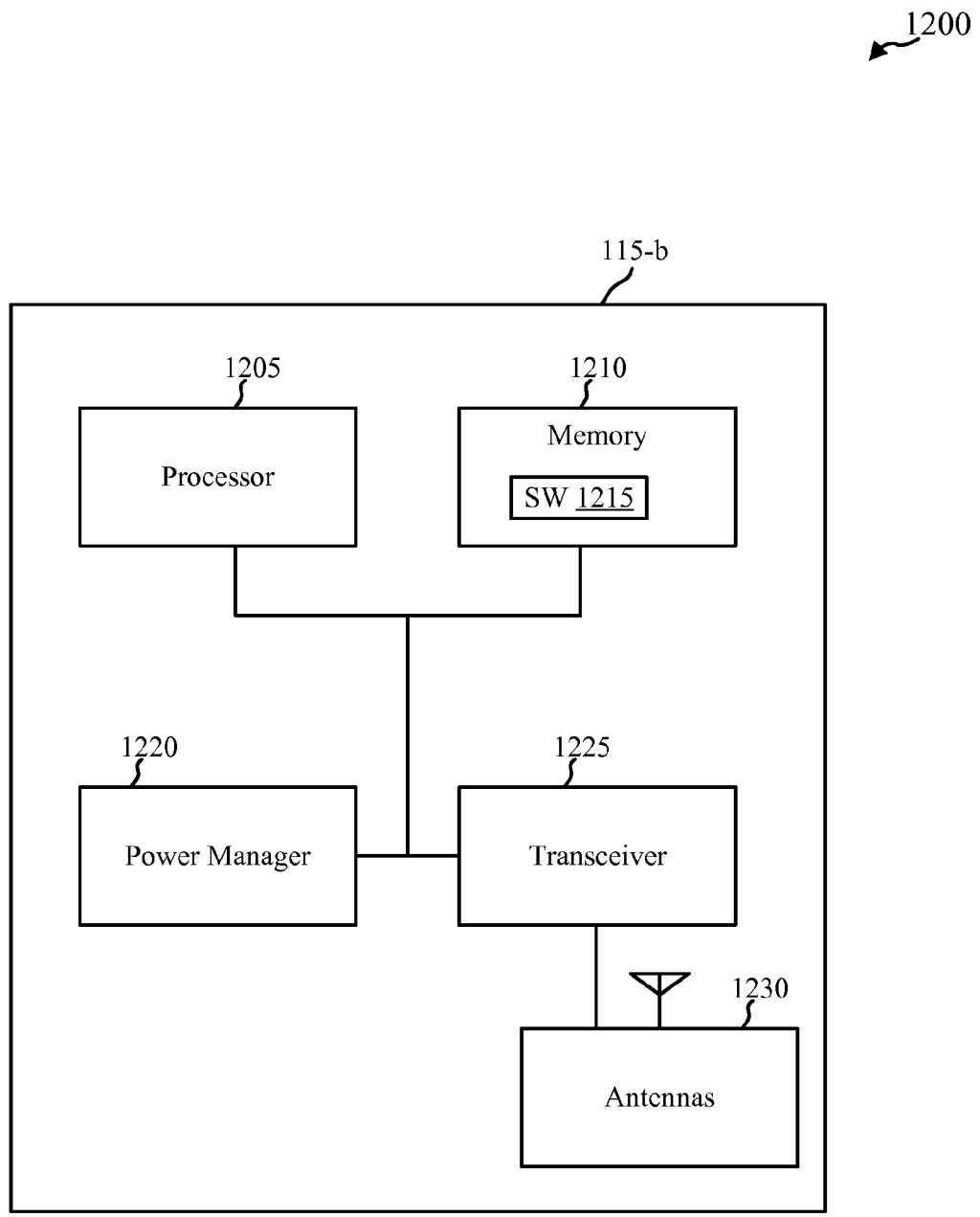
FIG. 12 shows a block diagram that illustrates an example of a station architecture according to various examples.

Turning to FIG. 12, a diagram 1200 is shown that illustrates a station 115-b configured for power conservation according to various examples. The station 115-b may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-b may have an internal power supply (not shown), such as a small battery, to facilitate mobile operation. The station 115-*b* may be an example of the stations 115 of FIG. 1.

The station 115-*b* may include a processor 1205, a memory 1210, a transceiver 1225, antennas 1230, and a power manager 1220. The power manager 1220 may be an example of the power save mode module 1115 of FIG. 11. Each of these components may be in communication with each other, directly or indirectly, over a bus(es) for example.

The memory 1210 may include random access memory (RAM) and read-only memory (ROM). The memory 1210 may store computer-readable, computer-executable software (SW) code 1215 containing instructions that are configured to, when executed, cause the processor 1205 to perform various functions described herein for power conservation. Alternatively, the software code 1215 may not be directly executable by the processor 1205 but be configured to cause the computer (e.g., when compiled and executed) to perform functions described herein.

The processor 1205 may include an intelligent hardware device, e.g., a central processing unit (CPU), a microcontroller, an application-specific integrated circuit (ASIC), etc. The processor 1205 may process information received through the transceiver 1225 and/or to be sent to the transceiver 1225 for transmission through the antennas 1230. The processor 1205 may handle, alone or in connection with the power manager 1220, various aspects for entering into a network sleep mode.

The transceiver 1225 may be configured to communicate bi-directionally with APs 105 in FIG. 1. The transceiver 1225 may be implemented as a transmitter(s) and a separate receiver(s). The transceiver 1225 may include a modem configured to modulate packets and provide the modulated packets to the antennas 1230 for transmission, and to demodulate packets received from the antennas 1230. While the station 115-*b* may include a single antenna, there may be examples in which the station 115-*b* may include multiple antennas 1230.

The components of the station 115-*b* may be configured to implement aspects discussed above with respect to FIGS. 2-10, and those aspects may not be repeated here for the sake of brevity. Moreover, the components of the station 115-*b* may be configured to implement aspects discussed below with respect to FIGS. 14-16, and those aspects may not be repeated here also for the sake of brevity.

Figure 13:
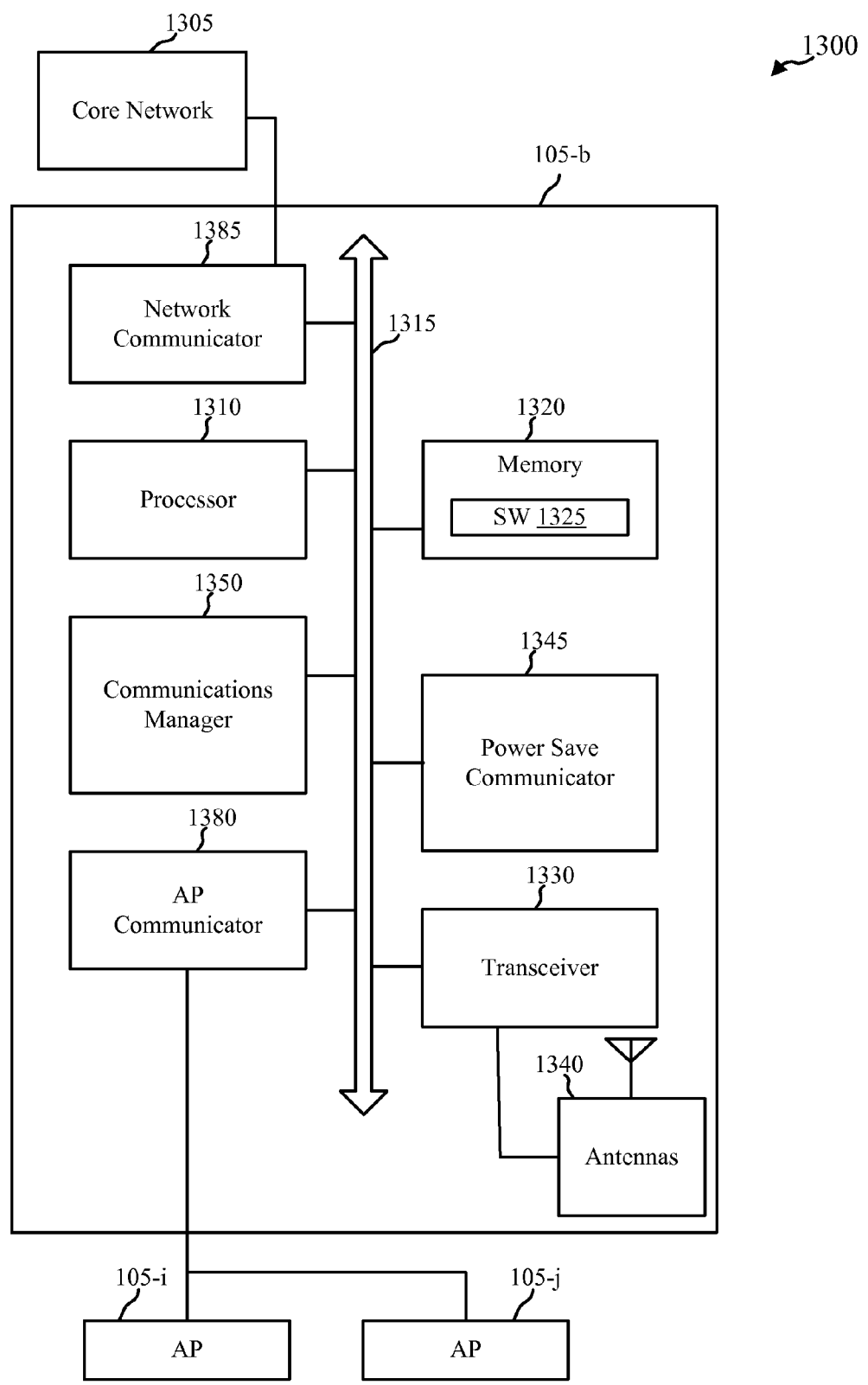
FIG. 13 shows a block diagram that illustrates an example of an AP architecture according to various examples.

Turning to FIG. 13, a diagram 1300 is shown that illustrates an access point or AP 105-*b* configured for power conservation according to various examples. In some examples, the AP 105-*b* may be an example of the APs 105 of FIG. 1. The AP 105-*b* may include a processor 1310, a memory 1320, a transceiver 1330, antennas 1340, and a power save communicator 1345. The power save communicator 1345 may be an example of the power save mode module 1115 of FIG. 11. In some examples, the AP 105-*b* may also include one or both of an AP communicator 1380 and a network communicator 1385. Each of these components may be in communication with each other, directly or indirectly, over a bus(es) 1315.

The memory 1320 may include RAM and ROM. The memory 1320 may also store computer-readable, computer-executable software (SW) code 1325 containing instructions that are configured to, when executed, cause the processor 1310 to perform various functions described herein for entry of a power save mode by a station, for example. Alternatively, the software code 1325 may not be directly executable by the processor 1310 but be configured to cause the computer, e.g., when compiled and executed, to perform functions described herein.

The processor 1310 may include an intelligent hardware device, e.g., a CPU, a microcontroller, an ASIC, etc. The processor 1310 may process information received through the transceiver 1330, the AP communicator 1380, and/or the network communicator 1385. The processor 1310 may also process information to be sent to the transceiver 1330 for transmission through the antennas 1340, to the AP communicator 1380, and/or to the network communicator 1385. The processor 1310 may handle, alone or in connection with power save communicator 1345, various aspects related to power save mode communications as discussed above.

The transceiver 1330 may include a modem configured to modulate packets and provide the modulated packets to the antennas 1340 for transmission, and to demodulate packets received from the antennas 1340. The transceiver 1330 may be implemented as a transmitter(s) and a separate receiver(s). The transceiver 1330 may be configured to communicate bi-directionally, via the antennas 1340, with a station(s) 115 as illustrated in FIG. 1 or FIG. 12, for example. The AP 105-*b* may typically include multiple antennas 1340 (e.g., an antenna array). The AP 105-*b* may communicate with a core network 1305 through the network communicator 1385. The AP 105-*b* may communicate with other APs, such as the access point 105-*i* and the access point 105-*j*, using an AP communicator 1380.

According to the architecture of FIG. 13, the AP 105-*b* may further include a communications manager 1350. The communications manager 1350 may manage communications with stations and/or other devices as illustrated in the WLAN 100 of FIG. 1, for example. The communications manager 1350 may be in communication with some or all of the other components of the AP 105-*b* via the bus or buses 1315. Alternatively, functionality of the communications manager 1350 may be implemented as a component of the transceiver 1330, as a computer program product, and/or as a controller element(s) of the processor 1310.

The components of the AP 105-*b* may be configured to implement aspects discussed above with respect to FIGS. 2-10, and those aspects may not be repeated here for the sake of brevity. Moreover, the components of the AP 105-*b* may be configured to implement aspects discussed below with respect to FIGS. 14-16 and those aspects may not be repeated here also for the sake of brevity.

Figure 14:
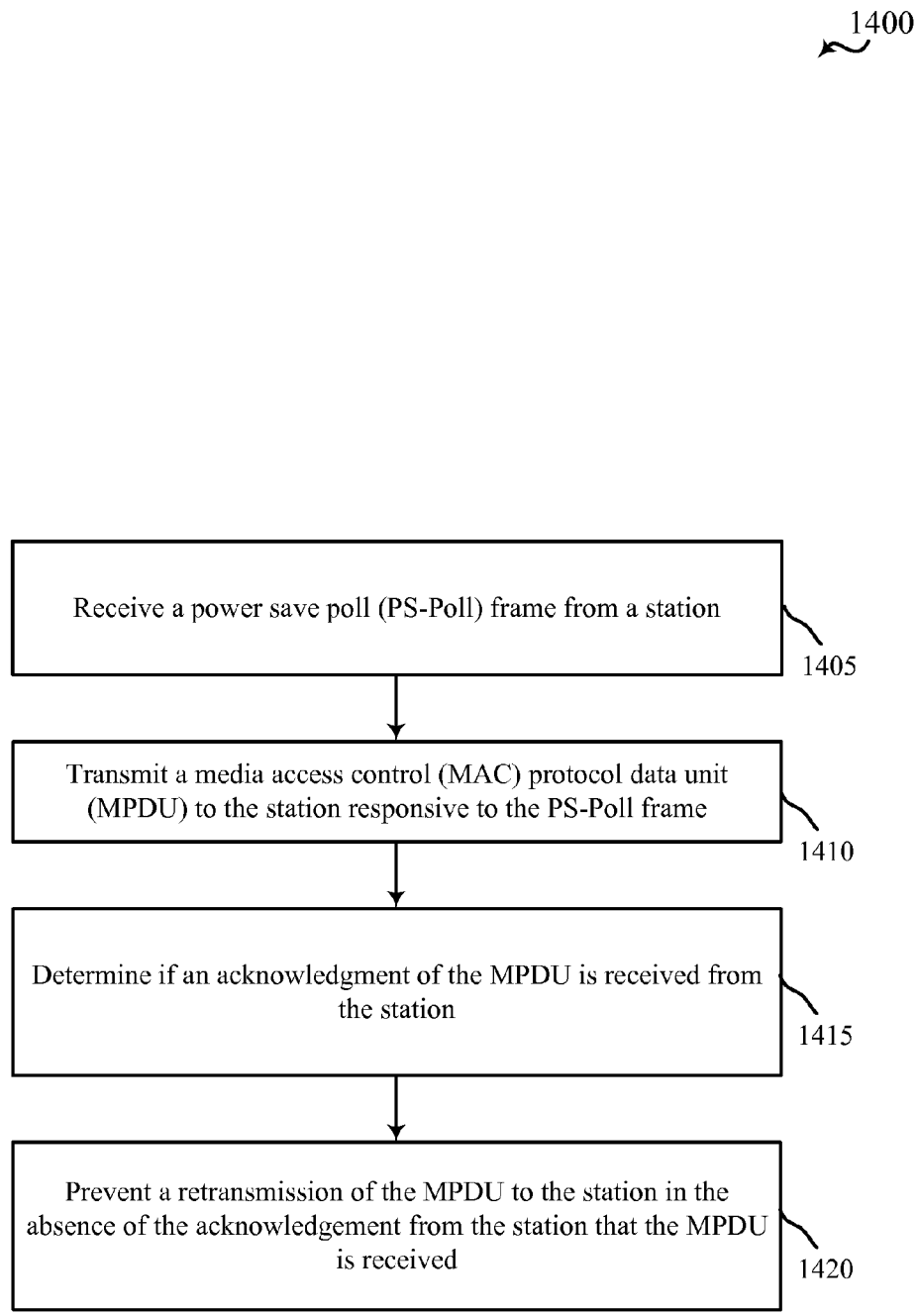
FIG. 14 is a flowchart of an example of a method for power conservation in a wireless communication system according to various examples.

Turning next to FIG. 14, a flow diagram is described for a method 1400 for power conservation in accordance with various examples. The method 1400 may be implemented using, for example, the APs 105 of FIG. 1 or 13; or the device 1100 of FIG. 11, for example. At block 1405, the AP may receive a power save poll (PS-Poll) frame from a station. At block 1410, the AP may transmit a MPDU to the station responsive to the PS-Poll frame. At block 1415, the AP determines if an acknowledgement of the MPDU is received from the station. Finally, the AP may prevent a retransmission of the MPDU to the station in the absence of the acknowledgement from the station that the MPDU is received.

Figure 15:
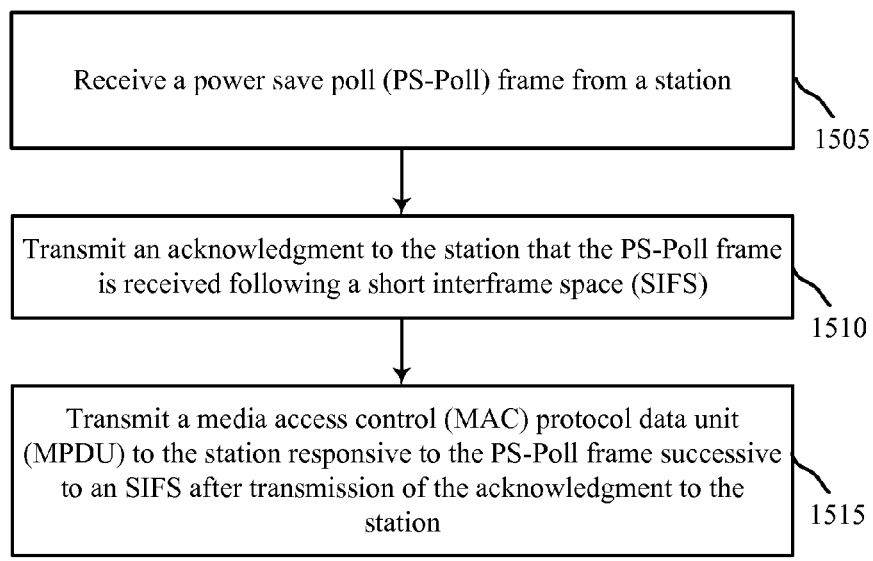
FIG. 15 is a flowchart of an example of another method for power conservation in a wireless communication system according to various examples.

Turning next to FIG. 15, a flow diagram is described for a method 1500 for power conservation in accordance with various examples. The method 1500 may be implemented using, for example, the APs 105 of FIG. 1 or 13; or the device 1100 of FIG. 11, for example. At block 1505, the AP receives a power save poll (PS-Poll) frame from a station. The AP then may transmit an acknowledgement to the station that the PS-Poll frame is received following a short interframe space (SIFS), according to block 1510. At block 1515, the AP transmits an MPDU to the station responsive to the PS-Poll frame successive to an SIFS after transmission of the acknowledgement to the station.

Figure 16:
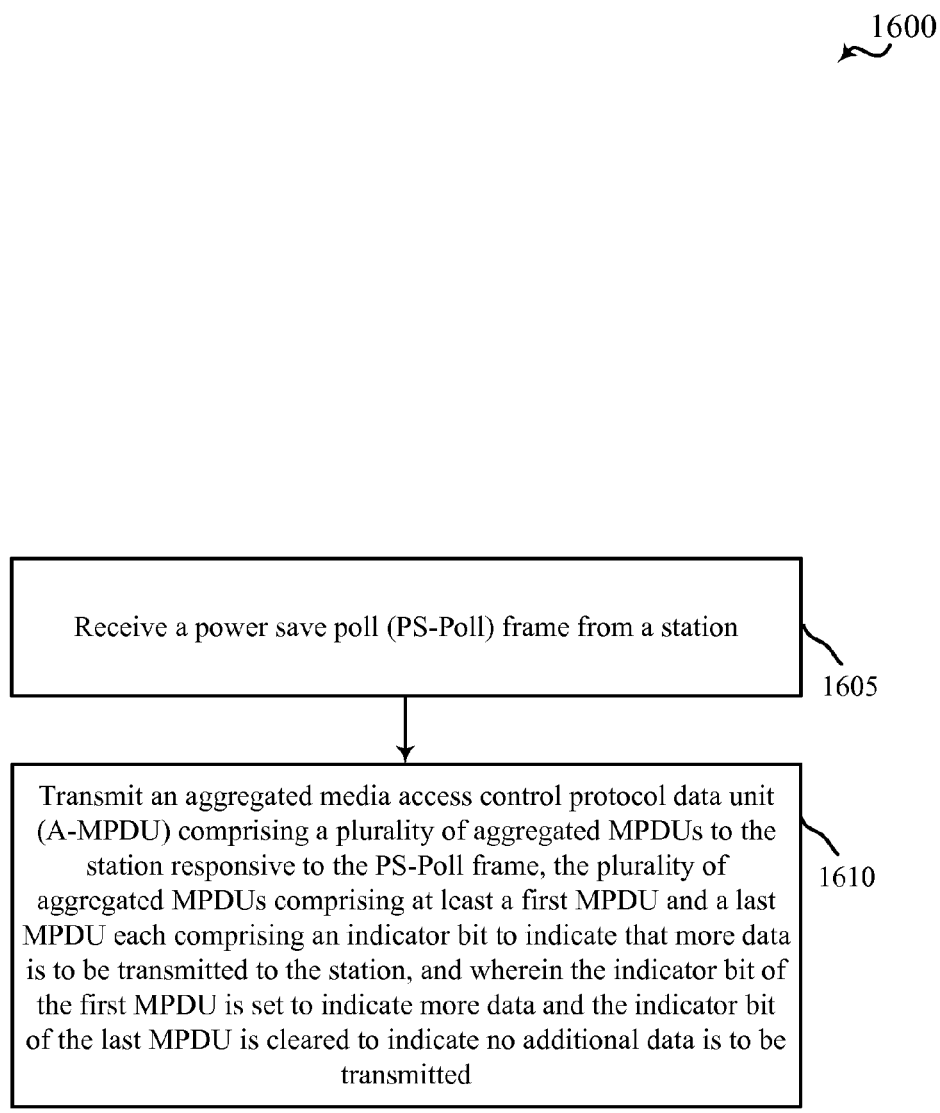
FIG. 16 is a flowchart of an example of yet another method for power conservation in a wireless communication system according to various examples.

Turning next to FIG. 16, a flow diagram is described for a method 1600 for power conservation in accordance with various examples. The method 1600 may be implemented using, for example, the APs 105 of FIG. 1 or 13; or the device 1100 of FIG. 11, for example. At block 1605, the AP receives a power save poll (PS-Poll) frame from a station. In response to the PS-Poll frame, the AP, at block 1610, transmits an A-MPDU comprising a plurality of MPDUs to the station, the plurality of MPDUs comprising a first MPDU and a last MPDU each comprising an indicator bit to indicate that more data is to be transmitted to the station, and wherein the indicator bit of the first MPDU is set to indicate more data and the indicator bit of the last MPDU is cleared to indicate no additional data is to be transmitted.

According to another aspect of this disclosure, described examples are directed to methods, systems, devices, and apparatuses to enable a WLAN access point (AP) to schedule packet transmissions to (or from) a mobile device taking into consideration the schedule of various other coexisting transmission/reception (Tx/Rx) activities on the mobile device. Various embodiments may increase throughput at the mobile device. Various embodiments also may benefit other stations associated with the same AP.

Tx/Rx activities coexisting with WLAN communications on the mobile device may include, for example, Long Term Evolution (LTE) and Bluetooth (BT). Additionally or alternatively, the coexisting Tx/Rx activities may include WLAN communications (e.g., Wi-Fi concurrency), such as when the mobile device accesses the Internet via the AP and concurrently communicates with another device, for example, in a peer-to-peer (P2P) network.

In one example, a WLAN AP may learn interference information (e.g., schedule, timing, etc.) from a coexisting radio at the mobile device (e.g., station). The AP may learn the interference information from the mobile device explicitly reporting to the AP. The device may report time windows with interference and a pattern of the windows, for example, using a proprietary signaling frame or an existing unscheduled automatic power save delivery (U-APSD) action frame (e.g., add traffic stream (ATS) frame). The device may notify the AP of the time windows during which the station is not available for receiving packets. The AP and mobile device may set up a BlockACK session to enable aggregated media access control (MAC) protocol data unit (A-MPDU) transmissions from the AP to the device. The device may send a trigger frame (e.g., PS-Poll) after the channel becomes available. In response, the AP may send an acknowledgment (ACK) followed by an A-MPDU with a size (e.g., #of sub-frames) adjusted according to the interference information. Thus, the size of the A-MPDU may be adjusted dynamically to fit the Wi-Fi time window that exists before the next interference window. The AP also may adjust the A-MPDU sizes to other non-coexistence stations using the interference information. Further, the AP may fragment the A-MPDU (or MPDU) using the interference information.

The scheduling techniques presented herein are generally described in connection with WLANs for simplicity. The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Figure 17A:
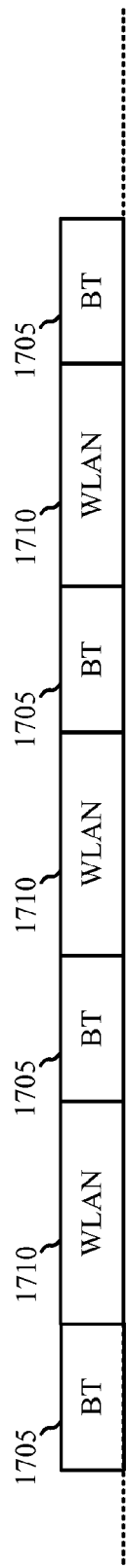
FIGS. 17A-D show diagrams that illustrate examples of coexisting communications at a mobile device.

Referring to FIG. 17A, an example 1700-a of coexisting communications at a mobile device is depicted. In this example, the mobile device may be a station 115 and may communicate with a WLAN AP 105, such as described above with respect to FIG. 1. As shown, the mobile device may communicate concurrently with the AP and another device via Wi-Fi (WLAN) and BT, respectively. BT communications 1705 and WLAN communications 1710 are illustrated in FIG. 17A as employing time division duplexing (TDD) on the mobile device. Alternatively or additionally, frequency division duplexing (FDD) may be employed to avoid mutual interference between WLAN and BT.

Figure 17B:
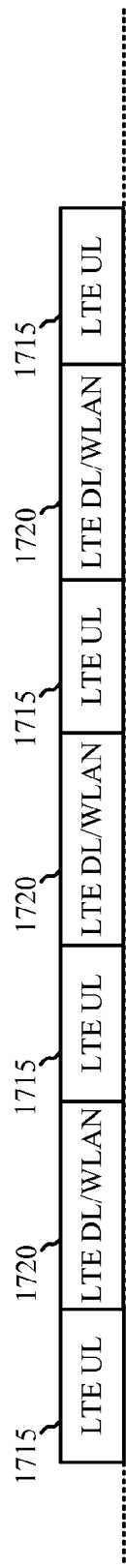

FIG. 17B illustrates an example 1700-b of coexisting communications at a mobile device. As above, the mobile device may be a station 115 and may communicate with a WLAN AP 105, such as described above with respect to FIG. 1. In this example, the mobile device may communicate concurrently with the AP and another device via Wi-Fi (WLAN) and LTE, respectively. LTE uplink (UL) communications 1715 and LTE downlink (DL)/WLAN communications 1720 are illustrated in FIG. 17B as employing TDD on the mobile device to avoid mutual interference between WLAN and LTE.

Figure 17C:
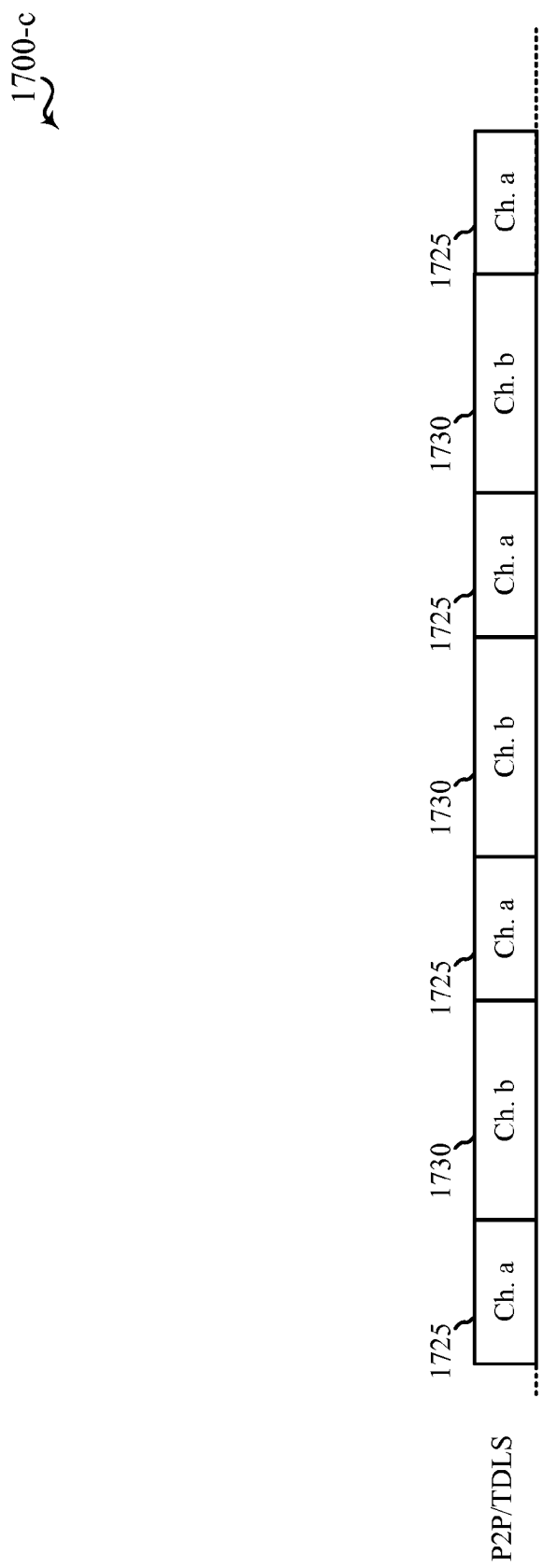

FIG. 17C illustrates an example 1700-c of coexisting communications at a mobile device. As above, the mobile device may be a station 115 and may communicate with a WLAN AP 105, such as described above with respect to FIG. 1. In this example, the mobile device may communicate concurrently with the AP via Wi-Fi (WLAN) to access the Internet and with another device via Wi-Fi over a P2P network or tunneled direct link setup (TDLS). WLAN communications 1725 on channel a may retrieve video and/or audio data from the Internet and P2P/TDLS communications 1730 on channel b may send the data to a displaying television. The WLAN communications 1725 and the P2P/TDLS communications 1730 are illustrated in FIG. 17C as employing TDD on the mobile device because the Wi-Fi cannot be active on both channels a and b at the same time.

Figure 17D:
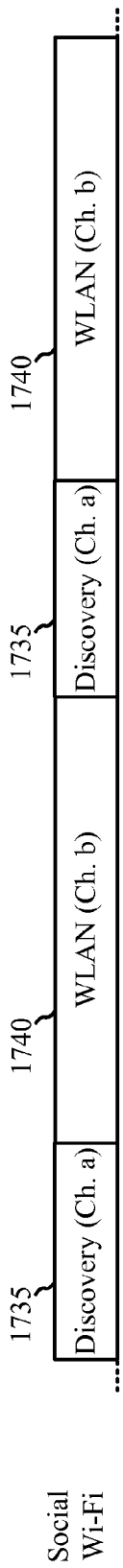

FIG. 17D illustrates an example 1700-d of coexisting communications at a mobile device. As above, the mobile device may be a station 115 and may communicate with a WLAN AP 105, such as described above with respect to FIG. 1. In this example, the mobile device may communicate using social Wi-Fi. The mobile device may have to tune to a discovery channel, e.g., channel a, periodically to perform communications 1735 for discovering other devices or to be discovered by other devices. When not in a discovery mode, the mobile device may perform social Wi-Fi (WLAN) communications 1740 on channel b. The discovery communications 1735 and the social Wi-Fi communications 1740 are illustrated in FIG. 17D as employing TDD on the mobile device because the Wi-Fi cannot be active on both channels a and b at the same time. Thus, the discovery time intervals (e.g., discovery windows) may be considered to be time windows during which the mobile device is not available for social Wi-Fi communications.

Existing solutions for coexisting communications at a mobile device, such as the coexisting communications depicted in FIGS. 17A-D, may not fully utilize the capacity of the WLAN radio of the mobile device. For example, a coexistence solution may involve a power save poll (PS-POLL) being sent from the mobile device to the AP when the mobile device is available to receive data via WLAN. The AP may respond to the PS-POLL by sending data to the mobile device. However, the AP may be able to deliver only one packet upon each PS-POLL. Overhead associated with the PS-POLL and potential processing delay at the AP may significantly limit WLAN throughput.

Another coexistence solution may involve a clear-to-send (CTS) signal, such as CTS-to-self. The CTS signal may block the entire basic service set (BSS), blocking transmissions from all other devices (e.g., stations) in the BSS. Such blocking may degrade the overall performance of the BSS.

When the CTS-based solution is used, the mobile device may explicitly disable A-MPDU to conservatively avoid collisions between AP's A-MPDU transmissions and BT activities on the mobile device, for example. As A-MPDU transmissions are employed to increase throughput, the foregoing existing solutions may be unsatisfactory or unsuitable.

Figure 18:
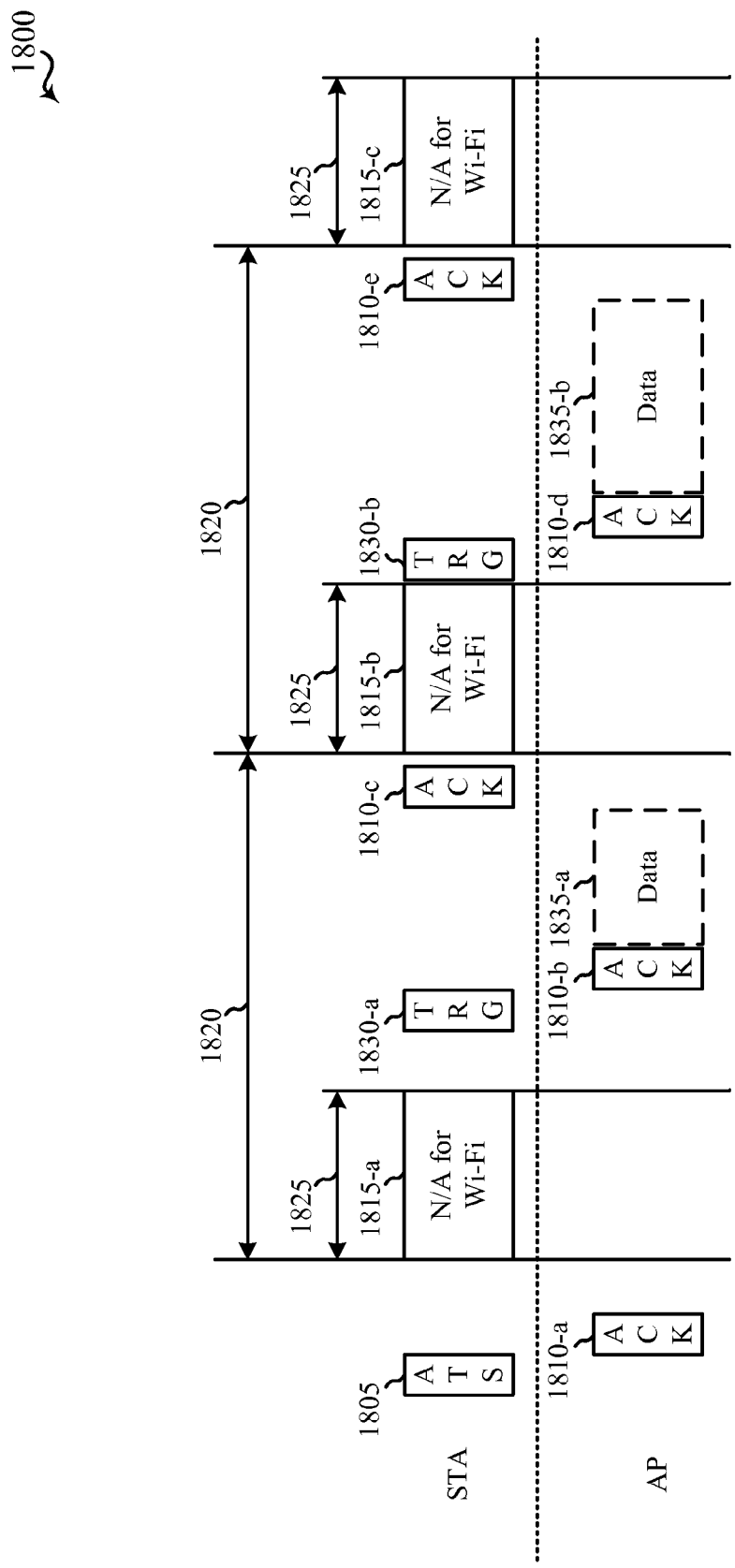
FIG. 18 shows a diagram that illustrates an example of transmissions between a station and an AP for taking into consideration scheduling information of other coexisting Tx/Rx activities on the station.

With reference now to FIG. 18, an example 1800 of transmissions between a station (STA) and an AP, such as between a station 115 and AP 105 of FIG. 1, according to one approach for taking into consideration scheduling information of other coexisting Tx/Rx activities on the STA is illustrated. In this example, the STA at some point determines interference information (e.g., schedule, timing, etc.) regarding the coexisting Tx/Rx activities on the STA. The interference information may include information on time windows with interference from the coexisting Tx/Rx activities, pattern(s) of the interference time windows, etc. The STA may be considered to not be available for Wi-Fi during interference time windows.

The interference information may be provided to the AP by the STA using propriety signaling frames or leveraging unscheduled automatic power save delivery (U-APSD). For example, the STA may use an add traffic stream (ATS) frame 1805 to notify the AP of the time windows during which the STA is not available for receiving packets. The ATS frame 1805 may be referred to as a coexistence action frame in the context of this disclosure. In response to the ATS frame, the AP may transmit an acknowledgment (ACK) frame 1810-*a* to the STA. The STA and the AP may set up a BlockACK session to enable data transmissions, such as MPDU or A-MPDU transmissions, from the AP to the STA.

As noted above, the interference information provided to the AP via the ATS frame 1805 may indicate time windows 1815 with interference and a pattern of the windows, for example. The predefined field of the ATS frame 1805 are capable of providing limited information to the AP. However, the ATS frame includes an additional field for providing vendor-specific information. This additional field may be used to provide additional interference information to the AP. Examples of additional interference information may include an estimated duration and/or interference level of each time window (e.g., interference time window) during which Wi-Fi at the STA is not available, and/or clock drift between the coexisting radios (e.g., WLAN and BT or LTE).

A simple periodic pattern of interference time windows 1815 is illustrated in FIG. 18 for clarity, with a period 1820. Also for simplicity, the interference time windows 1815 are illustrated as having a same duration 1825.

After the ATS frame 1805 has been transmitted by the STA and acknowledged by the AP, a first interference time window 1815-*a* may occur, during which the STA may be considered to be unavailable for Wi-Fi communications. After the first interference time window 1815-*a*, the STA may transmit a first trigger frame (e.g., a PS-Poll) 1830-*a* to the AP to indicate that the STA is ready to receive data from the AP. The AP may send an ACK frame 1810-*b* in response, and then transmit data 1835-*a* as a first A-MPDU, for example. Using the interference information received via the ATS frame 1805 from the STA, the AP may adjust a size (e.g., number of sub-frames) of the outgoing A-MPDU 1835-*a* so that the A-MPDU 1835-*a* may be successfully delivered within an available time window before a subsequent interference time window 1815-*b* occurs. The STA may transmit an ACK frame 1810-*c* in response upon successfully receiving the first A-MPDU 1835-*a*.

Additionally or alternatively, the AP may fragment the A-MPDU 1835 (or an MPDU) using the interference information if the available time window is not long enough to fit the entire A-MPDU. Such interference-information aware fragmentation may enable the STA to operate robustly (e.g., good Wi-Fi throughput) even when channel conditions are poor (e.g., such that not even a single packet may be transmitted successfully). For example, poor conditions may cause the AP to drop its physical layer (PHY) data rate due to WLAN transmission failures (e.g., caused by coexistence interference), which may lower overall network performance. Adjusting the number of sub-frames in an A-MPDU and/or fragmenting an A-MPDU as described herein may increase successful WLAN transmissions by avoiding interference time windows and potential collisions that would otherwise result. In particular, adjusting the fragmentation size may help at least some data to be transmitted successfully. Thus, the approaches described herein may help to avoid the AP dropping its PHY rate, the potential increase in collisions/transmission failures resulting from the AP dropping its PHY rate, the potential further lowering of the APs PHY rate in response to the increase in collisions/transmission failures, and so on, which eventually may render the Wi-Fi link of the AP unusable.

The AP may not be able to completely avoid overlapping between A-MPDU transmissions and interference time windows using the interference information, for example, due to a lack of fine-grained timing control of outgoing frames by the AP. In such case, the AP may calculate which part(s) of the A-MPDU may get corrupted by the overlapping interference and may ignore the part(s) in PHY rate control/adaptation. Such calculation may be using the actual transmission time of the A-MPDU and the actual start of the overlapping interference time window.

As illustrated in FIG. 18, the STA may send a second trigger frame 1830-*b* to the AP after the second interference time window 1815-*b* to indicate that the STA is ready to receive further data from the AP. The AP may send an ACK frame 1810-*d* in response, and then transmit data 1835-*b* as a second A-MPDU, for example. Using the interference information received via the ATS frame 1805 from the STA, the AP may adjust a size of the outgoing A-MPDU 1835-*b* so that the A-MPDU 1835-*b* may be successfully delivered within an available time window before a subsequent interference time window 1815-*c* occurs.

As shown, the adjusted size of the second A-MPDU 1835-*b* may differ from the adjusted size of the first A-MPDU 1835-*a*. In this example, the second A-MPDU 1835-*b* may be larger because the available time window before the subsequent interference time window 1815-*c* occurs is longer due to the second trigger frame 1830-*b* being sent sooner after the second interference time window 1815-*b*, as compared to the timing of the first trigger frame 1830-*a* after the first interference time window 1815-*a*. This is only one example of dynamically adjusting the size of an A-MPDU to fit the available non-interference time window. In practice, lengths of the available non-interference time windows may vary, for example, based in part on the duration 1825 of the preceding interference time window 1815 and the timing of the next interference time window 1815.

Special handling may be needed for retransmissions. If a retransmission of a packet to the STA cannot be performed in time because Wi-Fi will become unavailable, it may be desirable to avoid having the packet cause head-of-the-line blocking. When packets to other STAs can be transmitted, the packet to the STA may be buffered and the retry count of the packet for any later transmission may be remembered.

The approach described above with respect to FIG. 18 involves the STA determining interference information regarding the coexisting Tx/Rx activities on the STA and the STA transmitting the determined interference information to the AP. Additionally or alternatively, the AP may determine interference information of the STA by estimating the interference information implicitly, such as described below.

In some embodiments, the STA may be configured to attempt to stop the AP from transmitting packets to the STA when Wi-Fi is not available at the STA for receiving packets. The STA may transmit CTS frames and/or power save control frames (e.g., PS-Poll frames, QoS-Null frames, etc.) to attempt to stop the AP from transmitting packets to the STA. A pattern of such frames may be used by the AP to estimate whether the STA has an active coexistence radio, as well as to estimate information regarding the time windows during which Wi-Fi is unavailable for the STA. Using such estimated interference information, the AP may attempt to deliver data (e.g., MPDUs and/or A-MPDUs) to the STA. Such an approach may be employed, for example, when the AP has a relatively high confidence level regarding the estimated interference information or as long as the transmitted data is acknowledged by the STA as having been received successfully.

Figure 19:
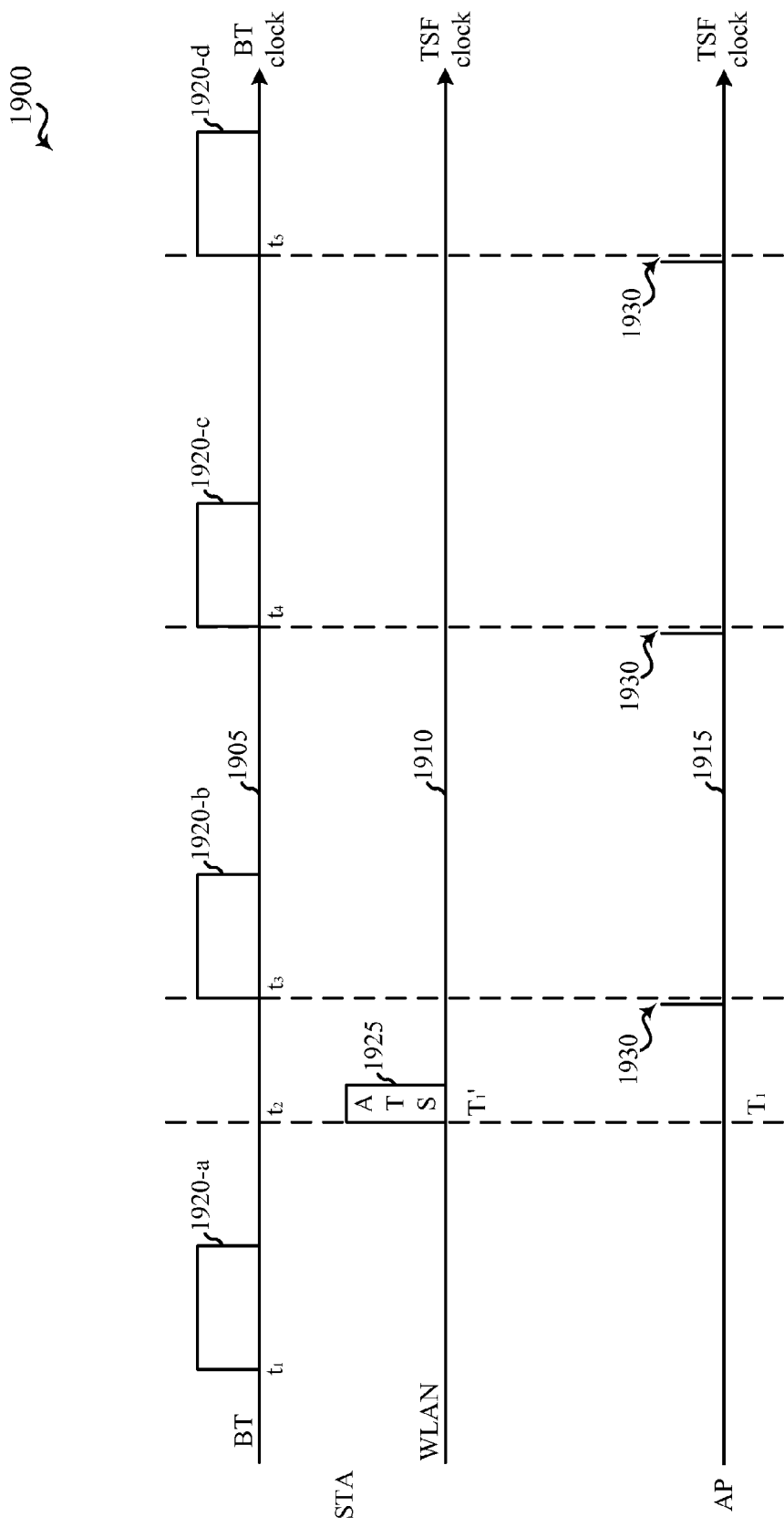
FIG. 19 shows a timing diagram that illustrates an approach for deriving timing information related to coexisting/interfering Tx/Rx activities on a station.

FIG. 19 shows a timing diagram 1900 that illustrates an approach for deriving timing information to be included, for example, in the ATS frame 1805 discussed above with respect to FIG. 18. Timing information in the notification from the STA to the AP may be derived from the timing synchronization function (TSF) clock for WLAN and the clock for the coexisting radio at the STA. On the STA, the WLAN radio and the BT (or LTE) radio typically run on different clocks. The BT clock may run independently from the STA TSF clock and timing of BT activities are derived from the BT clock. In order to derive the timing information to be reported to the AP, the timing of BT activities based on the STA TSF clock may be determined.

The timing diagram 1900 includes a timeline 1905 for the BT clock of the STA, a timeline 1910 for the TSF clock of the STA, and a timeline 1915 for the TSF clock of the AP. BT time windows (representing BT activities) 1920-$a$, 1920-$b$, 1920-$c$ and 1920-$d$ are shown as occurring at times $t_1$, $t_3$, $t_4$ and $t_5$, respectively, based on the BT clock. When an ATS frame 1925 is prepared at time $t_2$ on the BT clock (time $T_1'$ on the TSF clock of the STA), a time offset to the next BT time window is set according to the BT clock as $t_3-t_2$, where $t_3$ is the start of next BT time window 1920-$b$ based on the BT clock. Accordingly, the start time of the BT window 1920-$b$ based on the TSF clock will be $T_1'+t_3-t_2$. The interval between BT time windows 1920 may be calculated based on BT clock only. As noted above, the STA TSF clock (for WLAN) may be synchronized with the AP TSF clock, for example, using AP beacons. The difference between the STA TSF clock and the AP TSF clock is typically very small (e.g., less than 25 μs). A guard time may be set that is greater than or equal to the absolute value of $T_1'-T_1$, for example, to account for this difference.

In addition to dynamically adjusting the size of A-MPDUs sent to the mobile device/station having coexisting/concurrent communications as described above, various embodiments may have the AP adjust the size of A-MPDUs sent to another mobile device/STA that does not have coexisting/ concurrent communications. The AP may use the interference information provided to the AP from the coexistence station and/or implicitly determine by the AP, such as described above, to guide the adjustment of the size of A-MPDUs sent to the non-coexistence station.

Adjusting the size of A-MPDUs sent to the non-coexistence station(s) may improve overall throughput, and also may improve fairness with respect to the coexistence station. As illustrated in the diagram 2000-$a$ of FIG. 20A, the coexistence station (STA-c) may be at a disadvantage when competing for the WLAN medium with a non-coexistence or regular station (STA-r) in the same BSS.

The STA-c may have interference time windows 2005-$a$, 2005-$b$, etc., for example, due to concurrently active radios. When the Wi-Fi radio of the STA-c becomes available at the end of the first interference time window 2005-$a$, there may be an ongoing transmission 2010 of data to the STA-r. At the end of the ongoing transmission 2010, the STA-r may send an ACK frame 2015 to the AP. The AP may recognize and respond to a trigger frame (e.g., PS-Poll) 2020 only after the ACK frame 2015 is received by the AP. Thus, the ongoing transmission 2010 postpones a transmission 2025 of data (e.g., following an ACK frame 2030 from the AP to the STA-c) from the AP to the STA-c and thus limits throughput for the STA-c, for example, by allowing for a relatively small adjusted-sized A-MPDU for the transmission 2025 (e.g., with time for an ACK frame 2035 from the STA-c to the AP) before the next interference time window 2005-$b$ occurs. It should be understood that this problem may be exacerbated by the ever increasing WLAN devices and traffic in a network, which often may be the case in places such as airports, coffee shops, bookstores, libraries, etc.

Having the AP adjust the A-MPDU size to the non-coexistence station(s) may improve throughput for the coexistence station and fairness to the coexistence station. An example of this approach is illustrated in the diagram 2000-$b$ of FIG. 20B. As in FIG. 20A, the coexistence station STA-c may have interference time windows 2005-$a$, 2005-$b$, etc. In this example, however, when the AP sends a transmission 2010-$a$ to the STA-r, the AP may adjust the size of the A-MPDU (e.g., shortened as compared to the A-MPDU size of the transmission 2010 in FIG. 20A) so that the transmission 2010-$a$ stops around the time when the Wi-Fi radio of the STA-c is going to become available.

Figure 20A:
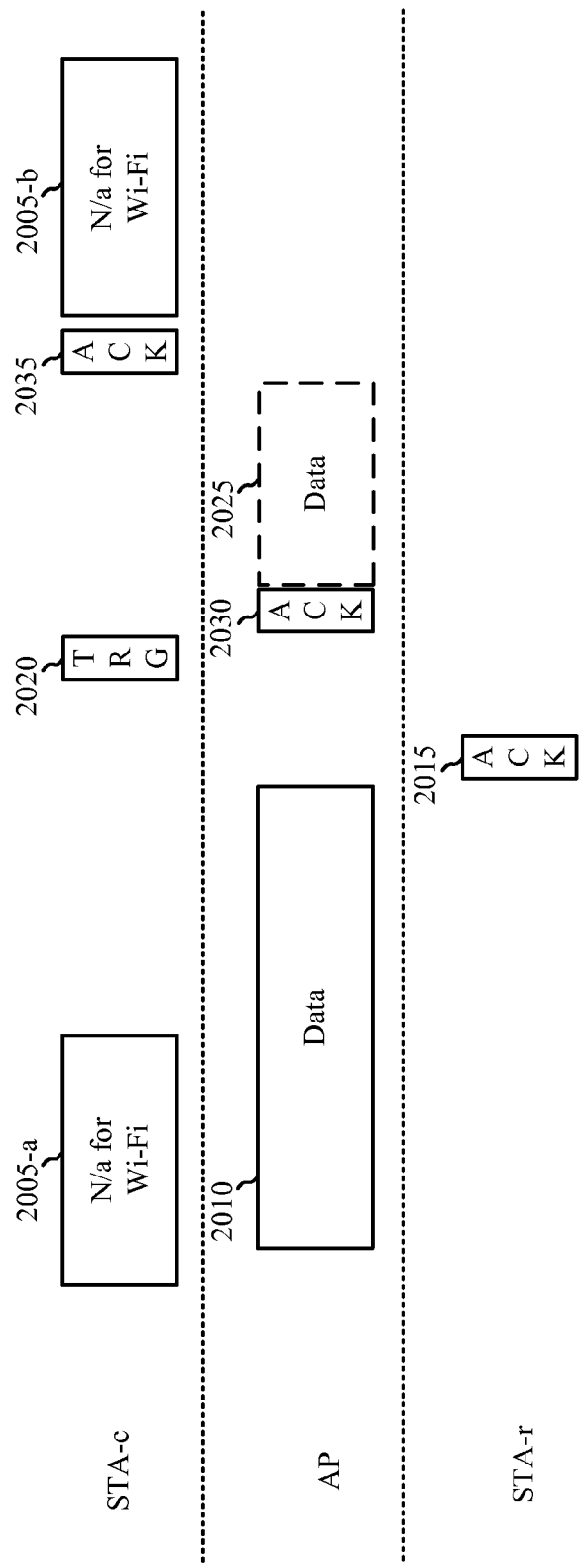
FIG. 20A shows a diagram that illustrates how a coexistence station may be at a disadvantage when competing for WLAN medium with a non-coexistence or regular station in the same BSS.
Figure 20B:
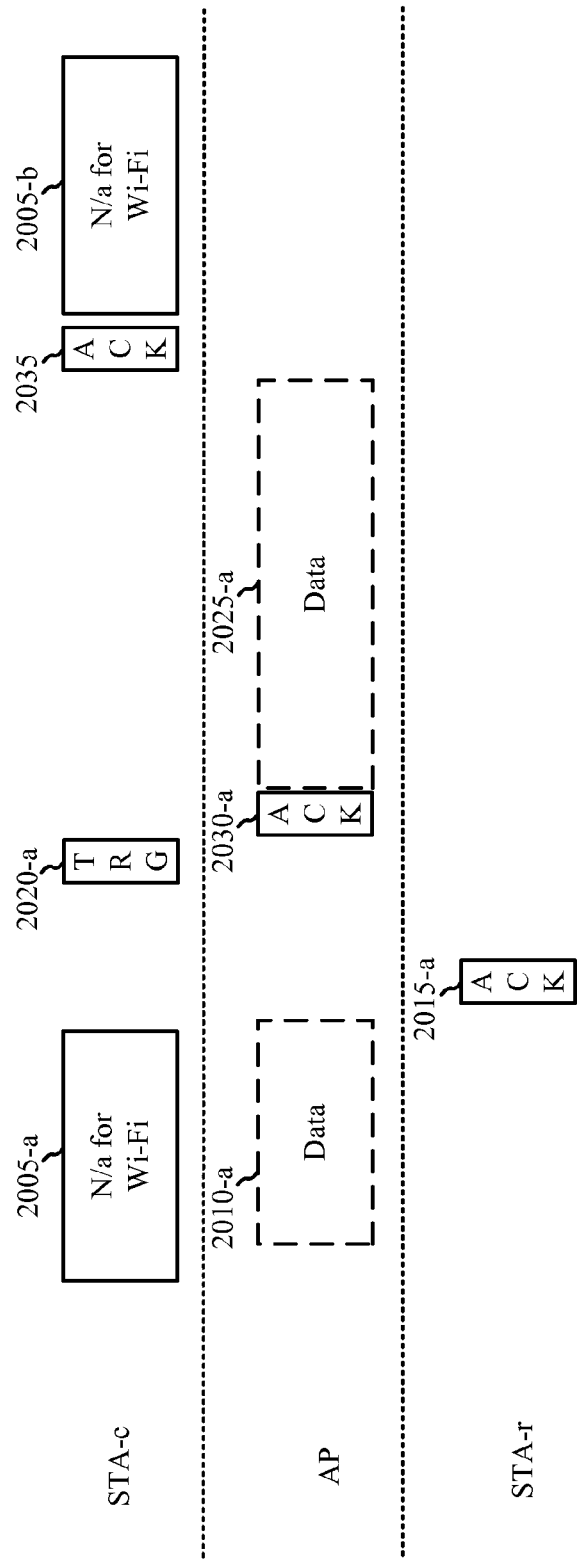
FIG. 20B shows a diagram that illustrates how adjusting the size of an A-MPDU to the non-coexistence station(s) may improve throughput for the coexistence station and fairness to the coexistence station.

Accordingly, an ACK frame 2015-$a$ at the end of the transmission 2010-$a$ may be sent by the STA-r to the AP sooner than in the example of FIG. 20A. Thus, the AP may recognize and respond to a trigger frame 2020-$a$ sooner than in the example of FIG. 20A, and sends a transmission 2025-$a$ of data (e.g., following an ACK frame 2030-$a$ from the AP to the STA-c) to the STA-c. As shown, the available time window for the transmission 2025-$a$ before the next interference time window 2005-$b$ occurs may allow for a larger adjusted-sized A-MPDU for the transmission 2025-$a$ (as compared to the available time window for the transmission 2025 in FIG. 20A). The shortened A-MPDU size may give the STA-c a better opportunity to gain access to the medium.

The foregoing examples illustrate how the AP may manage downlink traffic, which may be the most common scenario. However, the AP may control the parameters of a BlockACK session even for uplink traffic to help a coexistence station gain its share of the medium. If a non-coexistence station blocks transmissions from/to a coexistence station more often that is acceptable (e.g., greater than a threshold number of times and/or number of times within a certain time interval), the AP may reduce the size of the A-MPDU or may even disable the BlockACK for the transmissions from the non-coexistence station to the AP.

Figure 21:
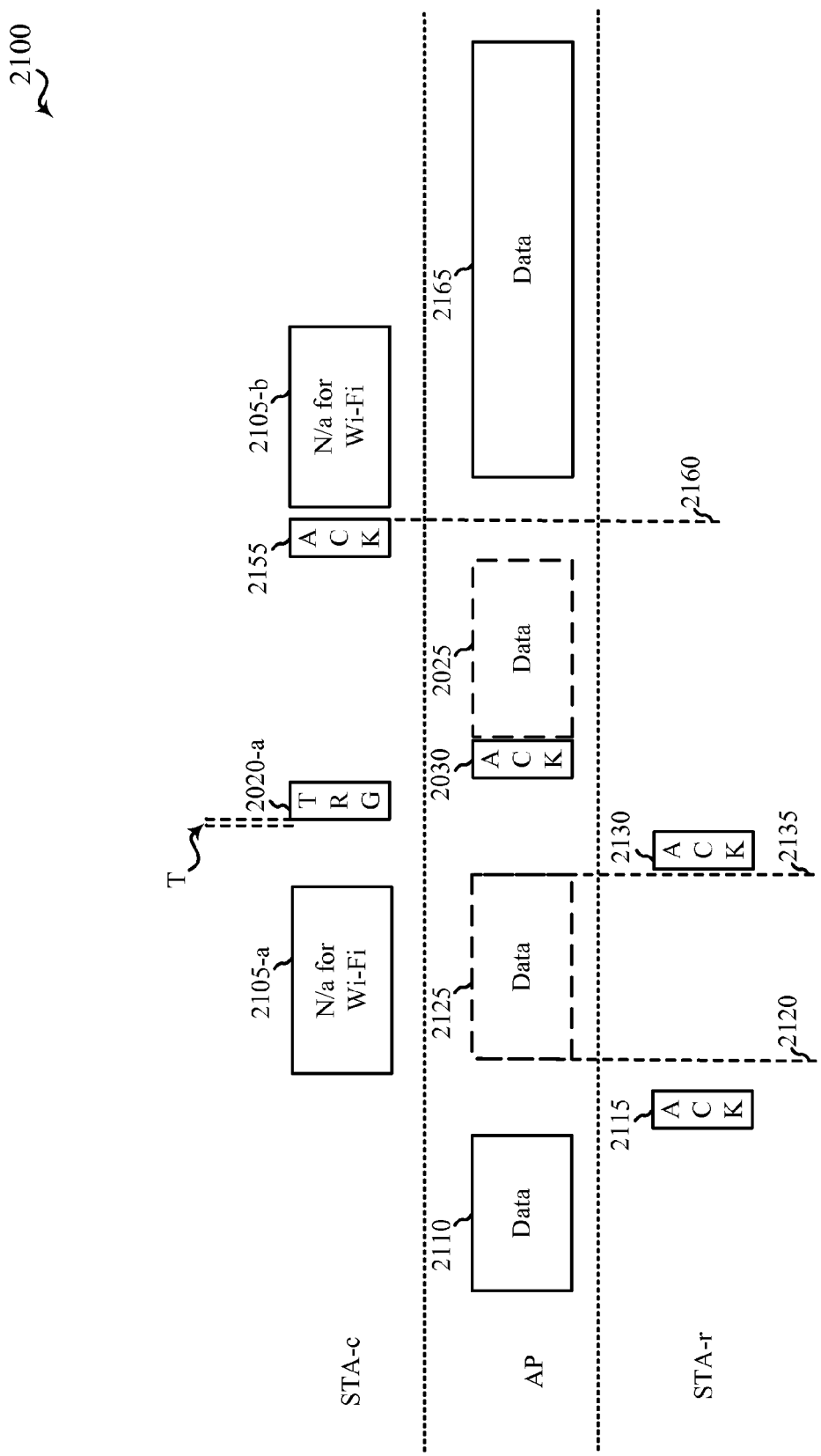
FIG. 21 shows a diagram that illustrates an example of transmissions between a coexistence station and an AP and transmissions between a non-coexistence or regular station and the AP.

With reference now to FIG. 21, an example 2100 of transmissions between a coexistence station STA-c and an AP and transmissions between a non-coexistence or regular station STA-r and the AP according to one embodiment is illustrated. This embodiment may implement an algorithm that employs the following information: interference information (e.g., schedule of interfering Tx and/or Rx activities at the coexistence station; whether there is any pending data for the coexistence station at the AP; whether the coexistence station has been bypassed for its turn based on the scheduling policy of the AP; and, a list of non-coexistence stations. Thus, according to the embodiment illustrated in FIG. 21, whether a transmission to the STA-c has been delayed due to interference. If so, the AP may transmit to some other STA, such as the STA-r during the interference and may give a priority for the medium to the STA-c right after the interference has ended.

The STA-c may have interference time windows 2105-a, 2105-b, etc., for example, due to concurrently active radios. Although not shown, interference information for the STA-c may be provided to the AP by the STA and/or may be derived implicitly by the AP, such as described above. After a first transmission 2110 of data to the STA-r and a corresponding ACK frame 2115 from the STA-r to the AP, the STA-c may have its turn to use the medium (e.g., based in part on the scheduling policy of the AP, such as round-robin, by access class, etc.).

However, because the Wi-Fi radio of the STA-c may be unavailable due to the first interference time window 2105-a, there may be only a small time window to send data to the STA-c. When the time window is too small for at least k (e.g., with a default value of 1) packet transmissions to the STA-c, allowing transmissions to other STAs (e.g., STA-r) from the AP may provide a better utilization of the medium rather than waiting for the STA-c to become available for reception (e.g., waiting for the interference time window to transpire). Thus, because the transmission of data waiting at the AP for the STA-c may be delayed, the AP may bypass the turn of the STA-c and set a flag, denoted 2120 in FIG. 21, to indicate that the STA-c has been bypassed due to the interference schedule of the STA-c.

The AP may choose a random regular station (e.g., STA-r) if multiple regular stations have data pending at the AP, which may avoid favoring one particular regular station. In this example, a transmission 2125 to the STA-r, including a corresponding ACK frame 2130 from the STA-r to the AP may occur and end slightly after the first interference time window 2105-a. For example, even though there may be ten sub-frames of data waiting at the AP for the STA-r, the AP may adjust the size (e.g., truncate) the A-MPDU of the transmission 2125 to include only two sub-frames, denoted by 2135, so that the transmission 2125 ends soon after the first interference time window 2105-a. This may allow the STA-c to detect the end of this communication (transmission 2125 and ACK frame 2130) between the AP and the STA-r and to compete for the medium relatively soon thereafter (e.g., almost immediately).

If the AP knows when the interference is over (e.g., with a certain degree of accuracy, the AP may begin transmitting data to the STA-c right after the transmission 2125 to the STA-r is completed (e.g., acknowledged by the STA-r). If the AP does not know the end time of the first interference time window 2105-a, the STA-c may employ a trigger (TRG) frame 2140 to notify the AP that first interference time window 2105-a has ended and the STA-c is ready to receive data from the AP. In such case, the STA-c may compete for the medium using the trigger frame 2140 with a wait time T (either fixed or dynamically set) that is shorter than a distributed inter-frame space DIFS plus a random backoff. T may be based on DIFS, reduced inter-frame space (RIFS) or short inter-frame space (SIFS). In some embodiments, a default value for T may be the SIFS. The shorter the wait time T, the greater the chance that the STA-c may win the medium time for the AP.

After the STA-c wins the medium time using the trigger frame 2120-a as shown in FIG. 21, the AP may transmit an ACK frame 2130 followed by a transmission 2025 of data to the STA-c. As discussed above, the size of an A-MPDU of the transmission 2025 may be adjusted to fit the available time window before the next interference time window 2025-b of the STA-c so that the transmission 2025 may be successfully completed.

Upon receiving an ACK frame 2155 from the STA-c indicating that the transmission 2150 was received successfully, the AP may clear the flag, denoted 2160 in FIG. 21, that was previously set to indicate that the STA-c had been bypassed. After the flag is cleared, a transmission to the STA-r that occurs during the interference time window 2105-b may not be adjusted (e.g., truncated) by the AP based on the interference information, for example, because the STA-c successfully received the transmission 2150.

Use of the flag may be modified, as appropriate or desired, based on certain conditions. For example, if a transmission to the STA-c fails, the flag may remain set. Also for example, if the STA-c fails, for a certain number of times (e.g., with a default value being 1), to utilize the medium time allocated to the STA-c, the AP may clear the flag.

In the case of multiple coexistence stations in the BSS, the AP may track collisions between trigger frames from the coexistence stations. Using such collision information, the AP may backoff the waiting time T for all but one of the coexistence stations. The one of the coexistence stations may be determined randomly, for example, to provide random access to the medium for the multiple coexistence stations.

Using an order of bypassing, the AP may set different wait time (T) values for the multiple coexistence stations. The different T values may establish a priority for the coexistence stations, such as by setting the T values in accordance with the order with the first bypassed coexistence station having a shortest T value, and so on. The setting of the different T values may involve sending non-standard messages to the multiple coexistence stations. However, the overhead associated with such messages may be reduced by adjusting (e.g., shortening) only the T value for the first bypassed coexistence station and leaving the T value(s) for the other coexistence station(s) at a default value. As the flags are successively removed, the next coexistence station in line may have its T value adjusted.

In addition to dynamically adjusting the size of A-MPDUs sent to the mobile device/station having coexisting/concurrent communications and/or adjusting the size of A-MPDUs sent to another mobile device/STA that does not have coexisting/concurrent communications, the AP may be configured to identify certain sub-frames errors using the interference information. Sub-frame errors, such as those at the end of an A-MPDU which are corrupted by the scheduled interference, may be predicted using the interference information. For example, based on the actual transmission time and configuration, the AP may find that the last three sub-frames overlap with the interference time window.

The AP may handle (e.g., resolve, avoid, render innocuous, etc.) the predicted sub-frame errors by treating the errors in rate control. For example, the AP may ignore errors of the last three sub-frames when calculating the packet error rate, which is used in determining the PHY rate for transmissions to the mobile device/station.

Figure 22:
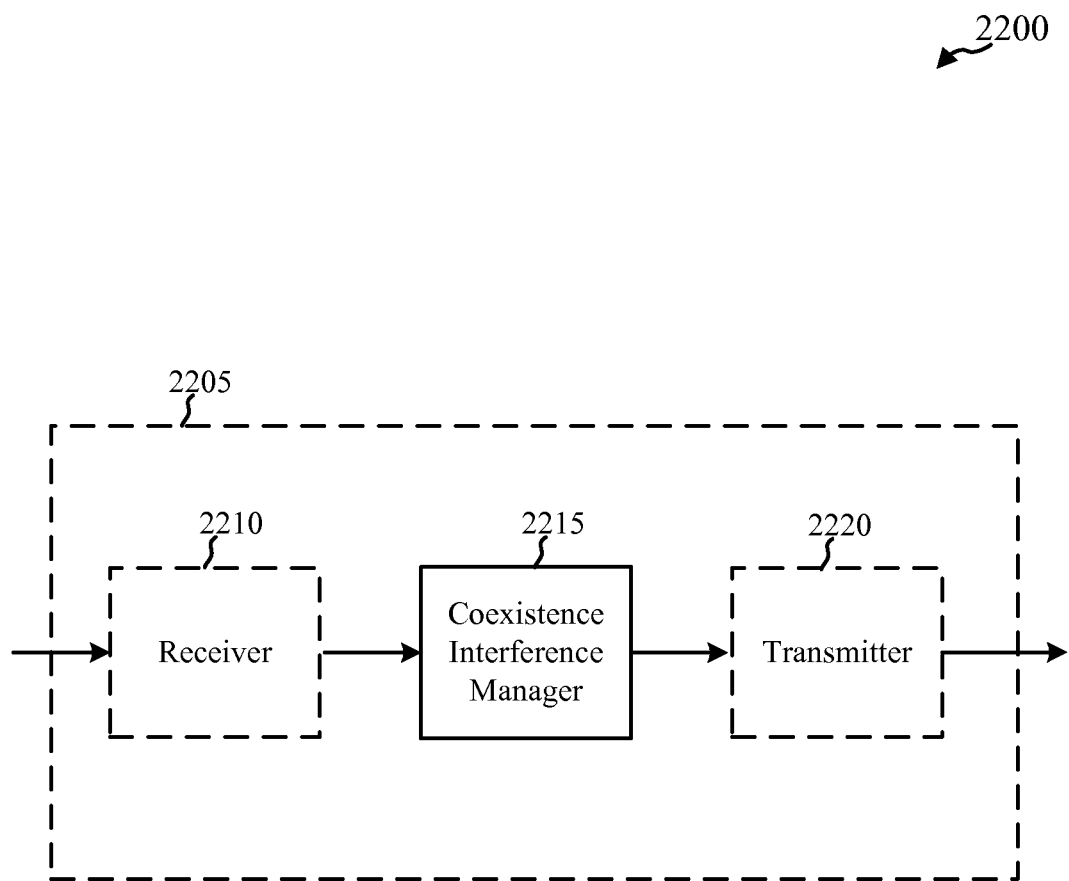
FIG. 22 shows a block diagram that illustrates an example of a device that may be used to implement various embodiments for dealing with coexistence interference.

With reference now to FIG. 22, a block diagram 2200 illustrates a device 2205 that may be used to implement various embodiments of the approaches for dealing with coexistence interference as described herein. The device 2205 may be an example of various aspects of the APs 105 or stations 115 described with reference to FIG. 1. The device 2205, or portions of it, may also be a processor. The device 2205 may include a receiver 2210, a coexistence interference manager 2215, and/or a transmitter 2220. Each of these components may be in communication with each other. The device 2205, through the receiver 2210, the coexistence interference manager 2215, and/or the transmitter 2220, may be configured to perform the various operations (e.g., determining interference information, transmit/receive interference information, adjusting a size of an A-MPDU (or MPDU), receive/transmit A-MPDUs (or MPDUs), identify sub-frame errors, etc.) described herein. The receiver 2210, the coexistence interference manager 2215, and/or the transmitter 2220 also may be configured to cooperate with other components (e.g., a rate adaptation controller—not shown) of the device 2205 to carry out the various operations described herein, such as discussed above with respect to FIGS. 18-21. Either alone or in combination with each other and/or other components not shown, the foregoing components of the device 2205 may be examples of means for performing the various operations described herein.

Figure 23:
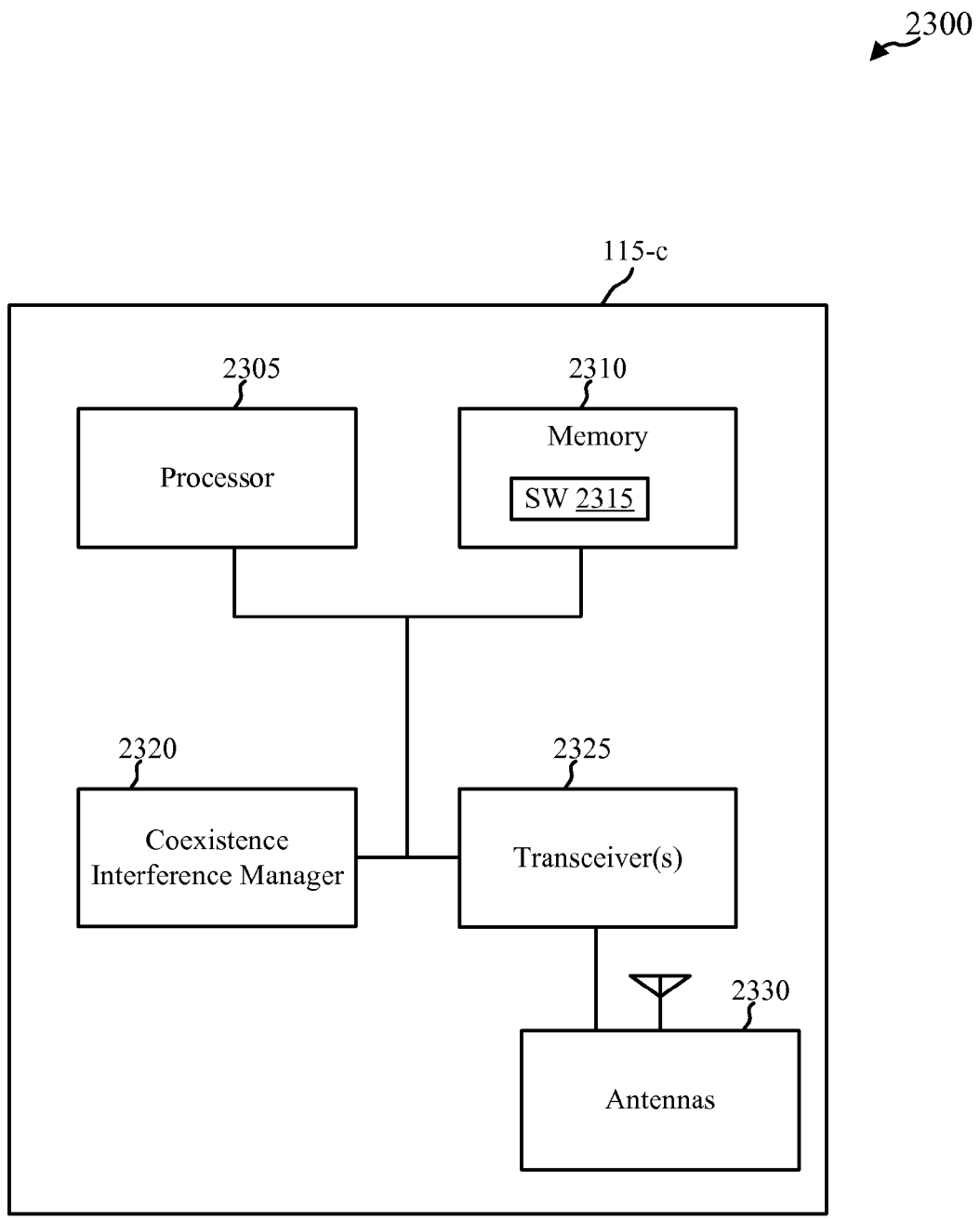
FIG. 23 shows a diagram that illustrates a station that may be used to implement various embodiments for dealing with coexistence interference.

Turning to FIG. 23, a diagram 2300 is shown that illustrates a station 115-c that may be used to implement various embodiments of the approaches for dealing with coexistence interference as described herein. The station 115-c may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-c may have an internal power supply (not shown), such as a small battery, to facilitate mobile operation. The station 115-c may be an example of the stations 115 of FIG. 1.

The station 115-c may include a processor 2305, a memory 2310, transceiver(s) 2325, antennas 2330, and a coexistence interference manager 2320. The coexistence interference manager 2320 may be an example of the coexistence interference manager 2215 of FIG. 22. Each of these components may be in communication with each other, directly or indirectly, over a bus(es) for example. The coexistence interference manager 2320 may be a computer program product and/or a controller element(s) of the processor 2305.

The memory 2310 may include random access memory (RAM) and read-only memory (ROM). The memory 2310 may store computer-readable, computer-executable software (SW) code 2315 containing instructions that are configured to, when executed, cause the processor 2305 to perform the various functions described herein for dealing with coexistence interference. Alternatively, the software code 2315 may not be directly executable by the processor 2305 but may be configured to cause the computer (e.g., when compiled and executed) to perform functions described herein.

The processor 2305 may include an intelligent hardware device, e.g., a central processing unit (CPU), a microcontroller, an application-specific integrated circuit (ASIC), etc. The processor 2305 may process information received through the transceiver 2325 and/or to be sent to the transceiver 2325 for transmission through the antennas 2330. The processor 2305 may handle, alone or in connection with the coexistence interference manager 2320, various aspects for dealing with coexistence interference.

The transceiver(s) 2325 may be configured to communicate bi-directionally with APs 105 in FIG. 1. The transceiver(s) 2325 may be implemented as a transmitter(s) and a separate receiver(s), for example, to operate the station 115-c in accordance with different radio access technologies (e.g., WLAN, BT, LTE, etc.). The transceiver(s) 2325 may include a modem configured to modulate packets and provide the modulated packets to the antennas 2330 for transmission, and to demodulate packets received from the antennas 2330. While the station 115-c may include a single antenna, there may be examples in which the station 115-c may include multiple antennas 2330.

The components of the station 115-c may be configured to implement aspects discussed above with respect to FIGS. 18-21, and those aspects may not be repeated here for the sake of brevity. Moreover, the components of the station 115-c may be configured to implement aspects discussed below with respect to FIG. 25, and those aspects may not be repeated here also for the sake of brevity. Thus, either alone or in combination with each other and/or other components not shown, the foregoing components of the station 115-c may be examples of means for performing the various operations associated with the stations as described herein.

Figure 24:
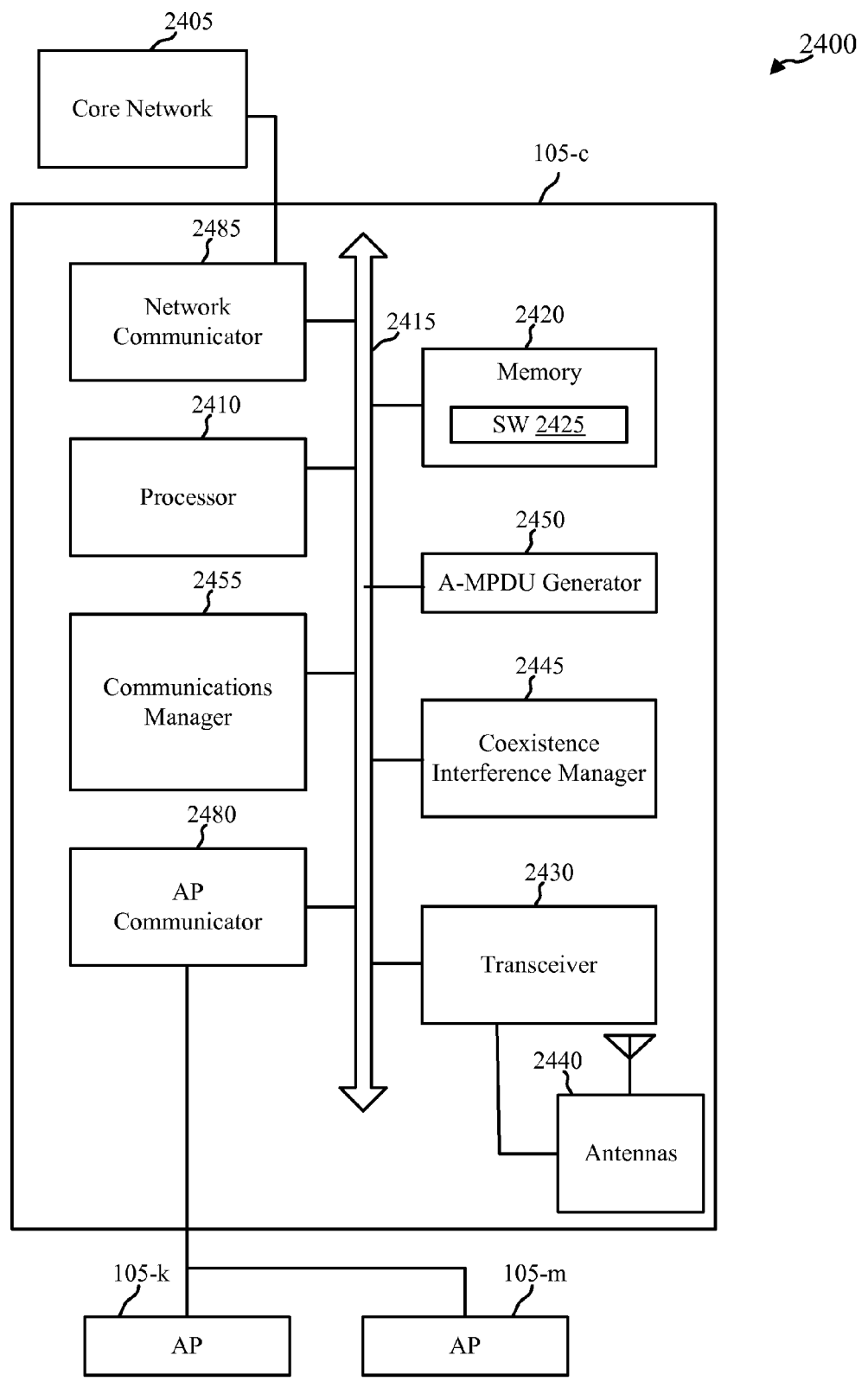
FIG. 24 shows a diagram that illustrates AP that may be used to implement various embodiments for dealing with coexistence interference.

Turning to FIG. 24, a diagram 2400 is shown that illustrates an access point or AP 105-c that may be used to implement various embodiments of the approaches for dealing with coexistence interference as described herein. In some examples, the AP 105-c may be an example of the APs 105 of FIG. 1. The AP 105-c may include a processor 2410, a memory 2420, a transceiver 2430, antennas 2440, a coexistence interference manager 2445 and/or an A-MPDU generator 2450. The A-MPDU generator 2450 and/or the coexistence interference manager 2445 may be an example of the coexistence interference manager 2215 of FIG. 22. In some examples, the AP 105-c may also include one or both of an AP communicator 2480 and a network communicator 2485. Each of these components may be in communication with each other, directly or indirectly, over a bus(es) 2415.

The memory 2420 may include RAM and ROM. The memory 2420 may also store computer-readable, computer-executable software (SW) code 2425 containing instructions that are configured to, when executed, cause the processor 2410 to perform various functions described herein for dealing with coexistence interference. Alternatively, the software code 2425 may not be directly executable by the processor 2410 but may be configured to cause the computer, e.g., when compiled and executed, to perform functions described herein.

The processor 2410 may include an intelligent hardware device, e.g., a CPU, a microcontroller, an ASIC, etc. The processor 2410 may process information received through the transceiver 2430, the AP communicator 2480, and/or the network communicator 2485. The processor 2410 may also process information to be sent to the transceiver 2430 for transmission through the antennas 2440, to the AP communicator 2480, and/or to the network communicator 2485. The processor 2410 may handle, alone or in connection with the A-MPDU generator 2450 and/or the coexistence interference manager 2445, various aspects related to coexistence interference as discussed above and further below.

The transceiver 2430 may include a modem configured to modulate packets and provide the modulated packets to the antennas 2440 for transmission, and to demodulate packets received from the antennas 2440. The transceiver 2430 may be implemented as a transmitter(s) and a separate receiver(s). The transceiver 2430 may be configured to communicate bi-directionally, via the antennas 2440, with a station(s) 115 as illustrated in FIG. 1 or FIG. 23, for example. The AP 105-*c* may typically include multiple antennas 2440 (e.g., an antenna array). The AP 105-*c* may communicate with a core network 2405 through the network communicator 2485. The AP 105-*c* may communicate with other APs, such as an access point 105-*k* and an access point 105-*m*, using the AP communicator 2480.

According to the architecture of FIG. 24, the AP 105-*c* may further include a communications manager 2455. The communications manager 2455 may manage communications with stations and/or other devices as illustrated in the WLAN 100 of FIG. 1, for example. The communications manager 2455 may be in communication with some or all of the other components of the AP 105-*c* via the bus or buses 2415. Alternatively, functionality of the communications manager 2455 may be implemented as a component of the transceiver 2430, as a computer program product, and/or as a controller element(s) of the processor 2410.

The components of the AP 105-*c* may be configured to implement aspects discussed above with respect to FIGS. 18-21, and those aspects may not be repeated here for the sake of brevity. Moreover, the components of the AP 105-*c* may be configured to implement aspects discussed below with respect to FIG. 26 and those aspects may not be repeated here also for the sake of brevity. Thus, either alone or in combination with each other and/or other components not shown, the foregoing components of the AP 105-*c* may be examples of means for performing the various operations associated with the APs as described herein.

Figure 25:
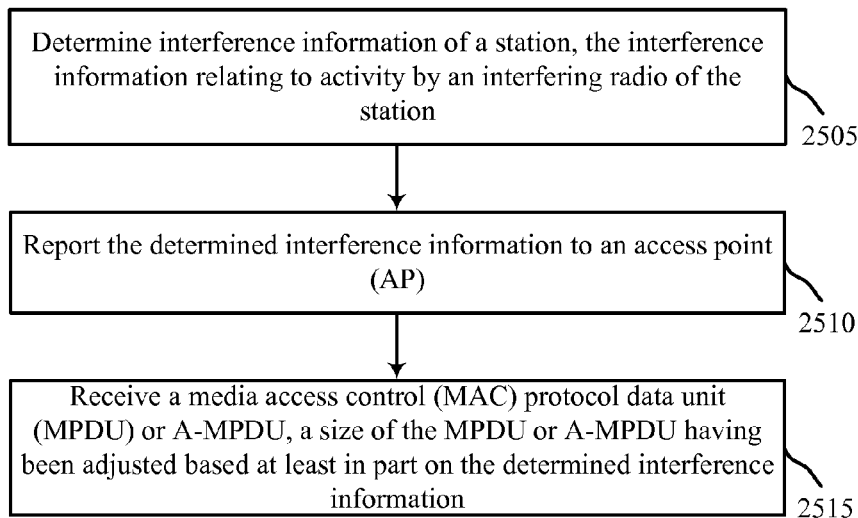
FIG. 25 is a flowchart of an example of a method for dealing with coexistence interference.

Turning next to FIG. 25, a flow diagram is described for a method 2500 for dealing with coexistence interference in accordance with various examples. The method 2500 may be implemented using, for example, the stations 115 of FIG. 1 or 23; or the device 2300 of FIG. 23, for example. At block 2505, the station may determine interference information relating to activity by an interfering radio thereof. This operation may be performed by the coexistence interference manager 2320 of FIG. 23 or the coexistence interference manager 2215 of FIG. 22, for example.

At block 2510, the station may report (e.g., transmit) the determined interference information to an access point (AP). This operation may be performed by the coexistence interference manager 2320 in conjunction with the processor 2305, the memory 2310 and/or the transceiver(s) 2325 of FIG. 23 or the coexistence interference manager 2215 in conjunction with the transmitter 2220 of FIG. 22, for example.

Then, at block 2515, the station may receive an MPDU (or A-MPDU) from the AP, which may have adjusted a size of the MPDU (or A-MPDU) using the determined interference information. This operation may be performed by the transceiver(s) 2325 in conjunction with the processor 2305, and/or a communications manager (not shown) of FIG. 23 or the receiver 2210 in conjunction with a communications manager (not shown) of FIG. 22, for example.

Figure 26:
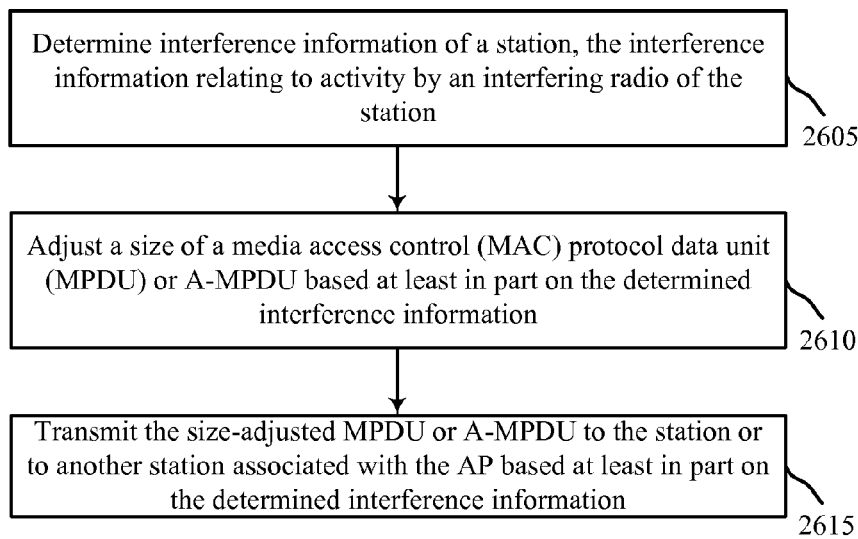
FIG. 26 is a flowchart of an example of another method for dealing with coexistence interference.

Turning next to FIG. 26, a flow diagram is described for a method 2600 for dealing with coexistence interference in accordance with various examples. The method 2600 may be implemented using, for example, the APs 105 of FIG. 1 or 24; or the device 2205 of FIG. 22, for example. At block 2605, the may determine interference information of a station relating to activity by an interfering radio of the station. This operation may be performed by receiving the interference information from the station and/or by implicitly determining (e.g., estimating) the interference information, such as described above. Thus, this operation may be performed by the coexistence interference manager 2445 in conjunction with the communications manager 2455, the processor 2410, the memory 2420 and/or the transceiver 2430 of FIG. 24, or the coexistence interference manager 2215 in conjunction with the receiver 2210 of FIG. 22.

At block 2310, the AP may adjust a size of an MPDU (or A-MPDU) using the determined interference information. This operation may be performed by generating the MPDU (or A-MPDU) with a desired number of sub-frames and/or fragmenting the MPDU (or A-MPDU), such as described above. Thus, this operation also may be performed by the coexistence interference manager 2445 and/or the A-MPDU generator 2450 in conjunction with the processor 2410 and/or the memory 2420 of FIG. 24, or the coexistence interference manager 2215 of FIG. 22.

Then, at block 2615, the AP may transmit the size-adjusted MPDU (or A-MPDU) to the station in accordance with the determined interference information. This operation may be performed, for example, in response to a triggering frame received by the AP from the station, or may be performed using the AP's knowledge of the end of a preceding transmission to a different station, such as described above. Thus, this operation also may be performed by the coexistence interference manager 2445 and/or the A-MPDU generator 2450 in conjunction with the communications manager 2455 and/or transceiver 2430 of FIG. 24, or the coexistence interference manager 2215 in conjunction with a communications manager (not shown) and/or the transmitter 2220 of FIG. 22, for example.

The methods described above with respect to FIGS. 25 and 26 are only examples of method that may be employed to deal with coexistence interference of a station. As such, various modifications of the operations may be made and/or additional operations may be added to achieve other methods in accordance with this disclosure.

The detailed description set forth above in connection with the appended drawings describes exemplary examples and does not represent the only examples that may be implemented or that are within the scope of the claims. The term "exemplary" when used in this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, a microprocessor(s) in conjunction with a DSP core, or any other such configuration.

The functions described herein may be implemented in hardware, software executed by a processor, firmware, or any combination thereof. If implemented in software executed by a processor, the functions may be stored on or transmitted over as an instruction(s) or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
receiving a power save poll (PS-Poll) frame from a station;
transmitting a media access control (MAC) protocol data unit (MPDU) to the station responsive to the PS-Poll frame;
performing a set number of retransmissions of the MPDU to the station;
determining if an acknowledgement of the MPDU is received from the station;
preventing a retransmission of the MPDU to the station in response to performing the set number of retransmissions if the acknowledgement of the MPDU is not received, wherein a data transmission rate for the station remains unadjusted if the acknowledgement of the MPDU is not received; and
adjusting the data transmission rate for the station if the acknowledgement of the MPDU is received in response to one of the retransmissions.

2. The method of claim 1,
wherein the data transmission rate for the set number of retransmissions of the MPDU remains unadjusted in the absence of the acknowledgement from the station that the MPDU is received for the set number of retransmissions and is adjusted for future retransmissions of the MPDU following the set number of retransmissions; and
wherein preventing the retransmission of the MPDU to the station is in response to performing the set number of retransmissions.

3. The method of claim 1, wherein adjusting the data transmission rate comprises updating a rate adaptation table responsive to at least one unacknowledged MPDU transmission.

4. The method of claim 1, further comprising:
determining that the acknowledgement is not received due to a channel condition of a transmission channel; and
adjusting a data transmission rate for the station responsive to the channel condition.

5. The method of claim 1, further comprising:
determining that the station has gone to network sleep following transmitting a limited number of retransmissions.

6. The method of claim 1, further comprising:
transmitting, prior to transmitting the MPDU, an acknowledgement to the station that the PS-Poll frame is received.

7. The method of claim 1, wherein the MPDU is an aggregated media access control protocol data unit (A-MPDU) comprising a plurality of MPDUs sent to the station responsive to the PS-Poll frame, the plurality of MPDUs comprising at least a first MPDU and a last MPDU each comprising an indicator bit to indicate whether more data is to be transmitted to the station, and wherein the indicator bit of the first MPDU is set to indicate more data and the indicator bit of the last MPDU is cleared to indicate no additional data is to be transmitted.

8. The method of claim 7, further comprising:
transmitting, prior to transmitting the A-MPDU, an acknowledgement to the station that the PS-Poll frame is received following a short interframe space (SIFS).

9. The method of claim 8, wherein the A-MPDU is transmitted successive to an SIFS after transmission of the acknowledgement to the station.

10. The method of claim 7, further comprising:
receiving a block acknowledgement (BA) from the station that the A-MPDU is received and indicating that at least one MPDU of the A-MPDU was not successfully received; and
assuming the station has gone to network sleep.

11. The method of claim 10, further comprising:
receiving a second PS-Poll frame from the station; and
transmitting a second A-MPDU to the station comprising at least one MPDU including data from the at least one MPDU not successfully received.

12. The method of claim 10, wherein the BA comprises a starting sequence number of MPDUs and a bitmap indicating successful reception of a plurality of MPDUs sequenced prior to the starting sequence number.

13. The method of claim 7, further comprising:
determining that a block acknowledgement (BA) is not received from the station;
determining that additional data is to be transmitted to the station that is included in the A-MPDU;
adding at least one additional MPDU to the A-MPDU to generate a second A-MPDU; and
transmitting the second A-MPDU to the station.

14. The method of claim 1, wherein the data transmission rate for the set number of retransmissions of the MPDU remains unadjusted in the absence of the acknowledgement from the station that the MPDU is received for the set number of retransmissions and is adjusted for future MPDU transmissions following the set number of retransmissions.

15. An apparatus for wireless communications, comprising:
a receiver configured to receive a PS-Poll frame from a station;
a transmitter configured to:
transmit a media access control (MAC) protocol data unit (MPDU) to the station responsive to the PS-Poll frame; and
perform a set number of retransmissions of the MPDU to the station; and
a power save communicator configured to
determine if an acknowledgement of the MPDU is received from the station and prevent a retransmission of the MPDU to the station in response to performing the set number of retransmissions if the acknowledgement of the MPDU is not received, wherein a data transmission rate for the station remains unadjusted if the acknowledgement of the MPDU is not received, and;
adjust the data transmission rate for the station if the acknowledgement of the MPDU is received in response to one of the retransmissions.

16. The apparatus of claim 15, wherein:
the data transmission rate for the set number of retransmissions of the MPDU remains unadjusted in the absence of the acknowledgement from the station that the MPDU is received for the set number of retransmissions and is adjusted for future retransmissions of the MPDU following the set number of retransmissions; and
the power save communicator is configured to prevent the retransmission of the MPDU to the station in response to the transmitter performing the set number of retransmissions.

17. The apparatus of claim 15, wherein adjusting the data transmission rate comprises updating a rate adaptation table responsive to at least one unacknowledged MPDU transmission.

18. The apparatus of claim 15, wherein the power save communicator is further configured to:
determine that the acknowledgement is not received due to a channel condition of a transmission channel; and
adjust a data transmission rate for the station responsive to the channel condition.

19. The apparatus of claim 15, wherein the power save communicator is further configured to:
determine that the station has gone to network sleep following transmitting a limited number of retransmissions.

20. The apparatus of claim 15, wherein the MPDU is an aggregated media access control protocol data unit (A-MPDU) comprising a plurality of MPDUs sent to the station responsive to the PS-Poll frame, the plurality of MPDUs comprising at least a first MPDU and a last MPDU each comprising an indicator bit to indicate whether more data is to be transmitted to the station, and wherein the indicator bit of the first MPDU is set to indicate more data and the indicator bit of the last MPDU is cleared to indicate no additional data is to be transmitted.

21. The apparatus of claim 20, wherein the power save communicator is further configured to:
determine that a block acknowledgement (BA) is not received from the station;
determine that additional data is to be transmitted to the station that is included in the A-MPDU;
add at least one additional MPDU to the A-MPDU to generate a second A-MPDU; and
the transmitter is further configured to transmit the second A-MPDU to the station.

22. The apparatus of claim 15, wherein the data transmission rate for the set number of retransmissions of the MPDU remains unadjusted in the absence of the acknowledgement from the station that the MPDU is received for the set number of retransmissions and is adjusted for future MPDU transmissions following the set number of retransmissions.

23. An apparatus for wireless communications, comprising:
means for receiving a power save poll (PS-Poll) frame from a station;
means for transmitting a media access control (MAC) protocol data unit (MPDU) to the station responsive to the PS-Poll frame;
means for performing a set number of retransmissions of the MPDU to the station;
means for determining if an acknowledgement of the MPDU is received from the station;
means for preventing a retransmission of the MPDU to the station in response to performing the set number of retransmissions if the acknowledgement of the MPDU is not received, wherein a data transmission rate for the station remains unadjusted if the acknowledgement of the MPDU is not received; and
means for adjusting the data transmission rate for the station if the acknowledgement of the MPDU is received in response to one of the transmissions.

24. The apparatus of claim 23, wherein the MPDU is an aggregated media access control protocol data unit (A-MPDU) comprising a plurality of MPDUs sent to the station responsive to the PS-Poll frame, the plurality of MPDUs comprising at least a first MPDU and a last MPDU each comprising an indicator bit to indicate whether more data is to be transmitted to the station, and wherein the indicator bit of the first MPDU is set to indicate more data and the indicator bit of the last MPDU is cleared to indicate no additional data is to be transmitted.

25. The apparatus of claim 24, further comprising:
means for determining that a block acknowledgement (BA) is not received from the station;
means for determining that additional data is to be transmitted to the station that is included in the A-MPDU;
means for adding at least one additional MPDU to the A-MPDU to generate a second A-MPDU; and
means for transmitting the second A-MPDU to the station.

26. A computer program product for wireless communications, the computer program product comprising a non-transitory computer-readable medium storing instructions executable by a processor to:
receive a power save poll (PS-Poll) frame from a station;
transmit a media access control (MAC) protocol data unit (MPDU) to the station responsive to the PS-Poll frame;
perform a set number of retransmissions of the MPDU to the station;
determine if an acknowledgement of the MPDU is received from the station;
prevent a retransmission of the MPDU to the station in response to performing the set number of retransmissions if the acknowledgement of the MPDU is not received, wherein a data transmission rate for the station remains unadjusted if the acknowledgement of the MPDU is not received; and
adjust the data transmission rate for the station if the acknowledgment of the MPDU is received in response to one of the retransmissions.

* * * * *